United States Patent
Acharya et al.

(10) Patent No.: US 11,418,434 B2
(45) Date of Patent: Aug. 16, 2022

(54) SECURING MPLS NETWORK TRAFFIC

(71) Applicant: Arista Networks, Inc., Santa Clara, CA (US)

(72) Inventors: Dipankar Bhatt Acharya, Saratoga, CA (US); Hugh W. Holbrook, Palo Alto, CA (US); François Labonté, Menlo Park, CA (US); Sambath Kumar Balasubramanian, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 334 days.

(21) Appl. No.: 16/590,359

(22) Filed: Oct. 1, 2019

(65) Prior Publication Data
US 2020/0106702 A1 Apr. 2, 2020

Related U.S. Application Data

(60) Provisional application No. 62/740,300, filed on Oct. 2, 2018.

(51) Int. Cl.
*H04L 9/40* (2022.01)
*H04L 45/50* (2022.01)

(52) U.S. Cl.
CPC .......... *H04L 45/50* (2013.01); *H04L 63/0485* (2013.01)

(58) Field of Classification Search
CPC .......................... H04L 45/50; H04L 63/0485
USPC ........................................................ 713/151
See application file for complete search history.

(56) References Cited

U.S. PATENT DOCUMENTS

| 10,708,245 B2 | 7/2020 | Sankaran et al. |
| 2002/0032797 A1 | 3/2002 | Xu |
| 2006/0274899 A1 | 12/2006 | Zhu |
| 2008/0141023 A1 | 6/2008 | Qi |

(Continued)

FOREIGN PATENT DOCUMENTS

| CN | 106301765 A | 1/2017 |
| CN | 106657121 A | 5/2017 |

OTHER PUBLICATIONS

"IEEE Standard for Local and Metropolitan Area Networks: Media Access Control (MAC) Security"; IEEE Computer Society, IEEE; 2006; https://ieeexplore.ieee.org/document/1678345.

(Continued)

*Primary Examiner* — Michael S McNally
(74) *Attorney, Agent, or Firm* — Chamberlain, Hrdlicka, White, Williams & Aughtry

(57) ABSTRACT

Methods, computer readable mediums, and systems for securing network traffic data. The method of securing network traffic data may include obtaining a network traffic data unit, that includes: a payload; forwarding information, that includes: a first forwarding portion; and a second forwarding portion that indicates a network tunnel; encryption type information; and encryption location information; analyzing a first segment of the first forwarding portion to obtain a first forwarding location; modifying the network traffic data unit, based on the encryption type information and the encryption location information, to obtain a modified network traffic data unit; and transmitting the modified network traffic data unit to the first forwarding location.

13 Claims, 9 Drawing Sheets

(56) References Cited

U.S. PATENT DOCUMENTS

| | | | |
|---|---|---|---|
| 2008/0304485 A1* | 12/2008 | Sinha | H04L 12/66 370/392 |
| 2009/0113202 A1 | 4/2009 | Hidle | |
| 2009/0204850 A1 | 8/2009 | Zhang et al. | |
| 2012/0207039 A1 | 8/2012 | Srinivasan | |
| 2013/0091350 A1 | 4/2013 | Gluck | |
| 2014/0280889 A1 | 9/2014 | Nispel et al. | |
| 2015/0010152 A1 | 1/2015 | Proulx et al. | |
| 2015/0269374 A1 | 9/2015 | Fan et al. | |
| 2016/0117449 A1 | 4/2016 | Hunn | |
| 2017/0366508 A1 | 12/2017 | Saraf | |
| 2019/0097745 A1 | 3/2019 | Mallela | |

OTHER PUBLICATIONS

"Special-Purpose Multiprotocol Label Switching (MPLS) Label Values"; IANA; Nov. 8, 2002; https://www.iana.org/assignments/mpls-label-values/mpls-label-values.xhtml.

A. Farrel et al.; "Opportunistic Security in MPLS Networks"; Network Working Group; Internet-Draft; Mar. 28, 2017.

A. Huttunen et al.; "UDP Encapsulation of IPsec ESP Packets"; Network Working Group, RFC 3948; Jan. 2005.

C. Filsfils et al.; "Segment Routing Architecture"; IETF, RFC 8402, Jul. 2018.

C. Kaufman et al.; "Internet Key Exchange Protocol Version 2 (IKEv2)"; Internet Engineering Task Force (IETF), RFC 7296; Oct. 2014.

C. Kaufman; "Internet Key Exchange (IKEv2) Protocol"; Network Working Group, RFC 4306; Dec. 2005.

D. Piper; "The Internet IP Security Domain of Interpretation for ISAKMP"; Network Working Group, RFC 2407; Nov. 1998.

E. Rosen et al.; "MPLS Label Stack Encoding"; Network Working Group, RFC 3032; Jan. 2001.

E. Rosen et al.; "Multiprotocol Label Switching Architecture"; Network Working Group, RFC 3031; Jan. 2001.

International Search Report issued in corresponding Application No. PCT/US2019/054344, dated Dec. 5, 2019.

J. Viega et al.; "The Use of Galois/Counter Mode (GCM) in IPsec Encapsulating Security Payload (ESP)"; Network Working Group, RFC 4106; Jun. 2005.

K. Kompella et al.; "Allocating and Retiring Special-Purpose MPLS Labels"; Internet Engineering Task Force (IETF), RFC 7274; Jun. 2014.

M. Mahalingam et al.; "Virtual eXtensible Local Area Network (VXLAN): A Framework for Overlaying Virtualized Layer 2 Networks over Layer 3 Networks"; Independent Submission, RFC 7348; Aug. 2014.

S. Kent; "IP Encapsulating Security Payload (ESP)"; Network Working Group, RFC 4303; Dec. 2005.

Written Opinion issued in corresponding Application No. PCT/US2019/054344, dated Dec. 5, 2019.

International Search Report issued in corresponding Application No. PCT/US2019/054340, dated Jan. 13, 2020.

Written Opinion issued in corresponding Application No. PCT/US2019/054340, dated Jan. 13, 2020.

* cited by examiner

SECURING MPLS NETWORK TRAFFIC

CROSS REFERENCE TO RELATED APPLICATIONS

This patent application claims the benefit of U.S. Provisional Patent Application Ser. No. 62/740,300 filed on Oct. 2, 2018 under 35 U.S.C. § 119(e). U.S. Provisional Patent Application Ser. No. 62/740,300 is incorporated herein by reference in its entirety.

BACKGROUND

Certain forms of encryption and decryption may not be capable of securing network traffic that utilizes specialized forwarding techniques. In such scenarios, specialized methods of encryption may be necessary to secure network traffic that is traversing a network using specialized forwarding techniques.

SUMMARY

In general, in one aspect, one or more embodiments relate to a method for securing network traffic data. The method may include: obtaining a network traffic data unit, comprising: a payload; forwarding information, comprising: a first forwarding portion; and a second forwarding portion that indicates a network tunnel; encryption type information; and encryption location information; analyzing a first segment of the first forwarding portion to obtain a first forwarding location; modifying the network traffic data unit, based on the encryption type information and the encryption location information, to obtain a modified network traffic data unit; and transmitting the modified network traffic data unit to the first forwarding location.

In general, in one aspect, one or more embodiments relate to a non-transitory computer readable medium comprising instructions that, when executed by a processor, perform a method for securing network traffic data. The method may include: obtaining a network traffic data unit, comprising: a payload; forwarding information, comprising: a first forwarding portion; and a second forwarding portion that indicates a network tunnel; encryption type information; and encryption location information; analyzing a first segment of the first forwarding portion to obtain a first forwarding location; modifying the network traffic data unit, based on the encryption type information and the encryption location information, to obtain a modified network traffic data unit; and transmitting the modified network traffic data unit to the first forwarding location.

In general, in one aspect, one or more embodiments relate to a system for securing network traffic data. The system may include an encryption device, configured to: obtain a network traffic data unit, comprising: a payload; forwarding information, comprising: a first forwarding portion; and a second forwarding portion that indicates a network tunnel; encryption type information; and encryption location information; analyze a first segment of the first forwarding portion to obtain a first forwarding location; modify the network traffic data unit, based on the encryption type information and the encryption location information to obtain a modified network traffic data unit; and transmit the modified network traffic data unit to the first forwarding location; and a decryption device, configured to: receive the modified network traffic data unit; and modify the modified network traffic data unit.

Other aspects of the embodiments disclosed herein will be apparent from the following description and the appended claims.

DETAILED DESCRIPTION

Figure 1:
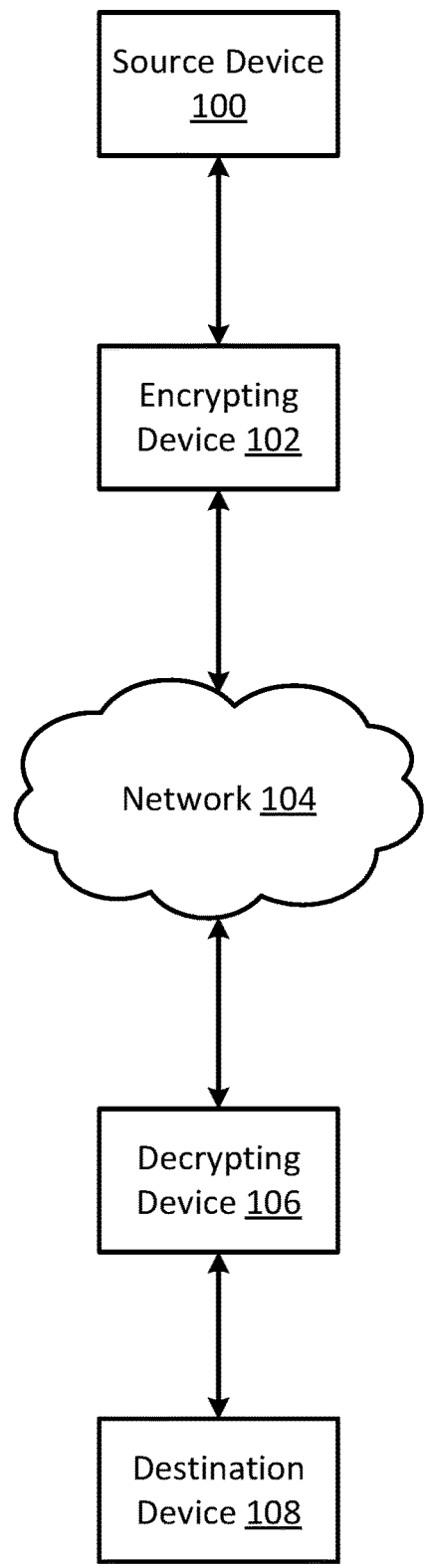
FIG. 1 shows a system in accordance with one or more embodiments.

Specific embodiments will now be described with reference to the accompanying figures. In the following description, numerous details are set forth as examples of one or more embodiments. It will be understood by those skilled in the art, and having the benefit of this Detailed Description, that one or more embodiments may be practiced without these specific details and that numerous variations or modifications may be possible without departing from the scope of the embodiments disclosed herein. Certain details known to those of ordinary skill in the art may be omitted to avoid obscuring the description.

In the following description of the figures, any component described with regard to a figure, in various embodiments disclosed herein, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments disclosed herein, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired directly between two devices) or indirect (e.g., wired and/or wireless connections between any number of devices connecting the operatively connected devices) connection.

As used herein, the term 'append', 'appends', or 'appended' means information (e.g., data) is added to already-existing information, without respect to where or how that information is added. For example, the phrase 'A is appended to B' may refer to the addition of information 'A' (e.g., a sequence of bits) being added to information 'B' (e.g., a sequence of bits), where information 'A' may be added to any part of information 'B' (e.g., at the beginning of 'B', at the end of 'B', and/or in some middle portion of 'B'). Further, information 'A' may further be segmented and added to various portions of information 'B', such that after information 'A' is appended to information 'B', a single conglomerate of information exists that includes both information 'A' and information 'B'.

In general, embodiments relate to methods and systems for modifying (e.g., encrypting) network traffic that is navigating a network using a specialized routing technique (e.g., multiprotocol label switching (MPLS)). Specifically, in one or more embodiments, network traffic that is to traverse a public network (and is thus susceptible to interception), has the payload included therein (and possibly a portion of the network forwarding information) encrypted prior to leaving a non-public site and entering into the public network.

In one or more embodiments, after traversing a public network fully encrypted, the encrypted traffic arrives at another non-public network. Once there, the network traffic may be modified again (e.g., decrypted) and continued to be forwarded towards the traffic's destination.

FIG. 1 shows a system in accordance with one or more embodiments. In one or more embodiments, the system includes a source device (100), an encrypting device (102), a network (104), a decrypting device (106), and a destination device (108). Each of these devices is described below.

In one or more embodiments, a source device (e.g., source device (100)) is a network device. A network device may be a physical device that includes and/or is operatively connected to persistent storage (not shown), memory (e.g., random access memory (RAM)) (not shown), one or more processor(s) (e.g., integrated circuits) (not shown), and at least one physical network port (not shown), which may also be referred to as an interface. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the physical network ports (i.e., interfaces) of the network device and to process the network traffic data units. In one or more embodiments, processing a network traffic data unit includes, but is not limited to, a series of one or more table lookups (e.g., longest prefix match (LPM) lookups, FEC lookups, etc.) and corresponding actions (e.g., forward from a certain egress port, add a labeling protocol header, rewrite a destination address, encapsulate, etc.). Such a series of lookups and corresponding actions may include how to route/transmit the network traffic data unit in order to transmit the network traffic data unit from an interface of the network device. One or more actions to be taken with regards to a received network traffic data unit may be obtained by a network device based on the network traffic data unit being recognized as located within a particular category, which may have one or more associated actions and/or items of information relevant to processing the network traffic data unit (e.g., label switched path protocol actions, multipath information, egress interface information, etc.).

In one or more embodiments, a network device also includes and/or is operatively connected to device storage and/or device memory (i.e., non-transitory computer readable mediums) storing software and/or firmware. Such software and/or firmware may include instructions which, when executed by the one or more processors (not shown) of a network device, cause the one or more processors to perform operations in accordance with one or more embodiments described herein.

In one or more embodiments, a network device may be capable of receiving and transmitting network data based on specialized routing techniques. For example, in one or more embodiments, a network device is capable of performing a forwarding action based on information obtained from the network traffic data unit. For example, in one or more embodiments, a network device is able to receive and analyze a network traffic data unit to identify the existence of forwarding information. Further, in one or more embodiments, if forwarding information is present, the forwarding information may indicate the destination of the network traffic data unit and/or a special routing technique (e.g., a particular network device, or set of network devices (i.e., a network path), through which the network traffic data unit is intended to traverse). Thus, if such forwarding information exists, the network device may be able to forward that network traffic data unit to the next appropriate network device without having to perform any traditional form of lookups or forwarding. Further, in one or more embodiments, prior to forwarding the network traffic data unit to the next device, the network device removes a segment of the forwarding information, as that segment is no longer needed and the next device in the route has been identified.

In one or more embodiments, a network device may be able to identify the destination of a network traffic data unit, perform a lookup, and identify, based on the destination, that the network traffic data unit is intended to traverse the network in a particular path. Accordingly, in one or more embodiments, the network device transmits the network traffic data unit to the next appropriate network device as specified by the lookup. In one or more embodiments, a network device may be capable of utilizing MPLS, shortest path bridging (SPB), equal-cost multipath routing (ECMP), generalized multiprotocol label switching (GMPLS), and/or any other routing techniques for the forwarding of network traffic data units.

In one or more embodiments, a source device (e.g., source device (100)) is a device that generates a network traffic data unit and forwards that network traffic data unit to another network device. In one or more embodiments, the source device (e.g., source device (100)) may be a computing system that includes functionality to communicate with the destination device (e.g., destination device (108)). More specifically, the source device (e.g., source device (100)) may include functionality to generate and transmit network traffic data units addressed to the destination device (e.g., destination device (108)). In one or more embodiments, a source device (e.g., source device (100)) may include functionality to generate some or all of the path network traffic must traverse to arrive at a destination device (e.g., destination device (108)). For example, in addition to generating network traffic, a source device (e.g., source device (100)) may generate other data (e.g., headers, tails, frames, label stacks) that specify one or more network devices that the generated network traffic must traverse to arrive at a destination device (e.g., destination device (108)). In one or more embodiments, the source device may, at least, specify an encrypting device (e.g., encrypting device (102)), a decrypting device (e.g., decrypting device (106)), and a destination device (e.g., destination device (108)) as devices through which the network traffic must traverse. Examples of a source device (e.g., source device (100)) include, but are not limited to, a desktop computer, a laptop computer, a tablet computer, a server, a smartphone, a personal digital assistant (PDA), a network device, etc.

Although not shown, there may exist more than one source device (e.g., source device (100)). In one or more embodiments, a source device (e.g., source device (100)) is any network device that generates a network traffic data unit. In one or more embodiments, a source device (e.g., source device (100)) is any network device that generates a network traffic data unit with forward segments to reach a destination (e.g., destination device (108)) segment through an encrypting device (e.g., encrypting device (102)) and/or a decrypting device (e.g., decrypting device (106)). For example, a plurality of devices may exist that may each individually be considered a source device (e.g., source device (100)), relative to any particular network traffic data unit generated by that source device (e.g., source device (100)).

In one or more embodiments, an encrypting device (e.g., encrypting device (102)) is any hardware (e.g., circuitry), or a combination of hardware and software, capable of receiving data, processing the data to obtain modified data, and transmitting the data. Further, in one or more embodiments, an encrypting device (e.g., encrypting device (102)) may be a network device. The modification performed by an encrypting device (e.g., encrypting device (102)) may be of any type that transforms the data from one form to another (e.g., encryption, decryption, appending of headers and/or tails, addition and/or removal of tags and/or identifiers, authentication, verification, etc.). Further, in one or more embodiments, the encryption and/or decryption performed by the encrypting device (e.g., encrypting device (102)) may be similar to, or some variation of, Medium Access Control type Security (MACsec) as standardized by the Institute of Electrical and Electronics Engineers (IEEE) in IEEE 802.1AE. In one or more embodiments, the encryption performed by the encrypting device (e.g., encrypting device (102)) may utilize Advanced Encryption Standard Galois/Counter Mode (AES-GCM). In one or more embodiments, an encrypting device (e.g., encrypting device (102)) may modify only a portion of the data that the encrypting device (e.g., encrypting device (102)) is provided (e.g., modifying only a payload, but not forwarding information). Alternatively, in one or more embodiments, an encrypting device (e.g., encrypting device (102)) may modify both a portion of the data which the decrypting device (e.g., decrypting device (106)) is provided and forwarding information (e.g., modifying a payload and tunneling headers or the identifier). Additionally, in one or more embodiments, an encrypting device (e.g., encrypting device (102)) may be capable of transmitting or causing the transmission of the data to another device or component (e.g., another network device) after modification. In one or more embodiments, the encrypting device (e.g., encrypting device (102)) is operatively connected to a source device (e.g., source device (100)) and/or operatively connected to a network (e.g., network (104), or some part thereof).

In one or more embodiments, an encrypting device (e.g., encrypting device (102)) may generally secure the network traffic data unit (or some portion thereof). As used herein, securing a network traffic data unit (or some portion thereof) may include one or more processes, including (i) encrypting (rendering data unreadable without first being decrypted), (ii) generating and appending a hash and/or sequence number (to make malicious repeating more difficult), (iii) appending decryption information, and/or (iv) appending and/or modifying any other information that would prevent, or make more difficult, the malicious and/or fraudulent interception, reading, processing, modification, and/or recreation of data of the encrypted network traffic data unit.

Although not shown, there may exist more than one encrypting device (e.g., encrypting device (102)). In one or more embodiments, a plurality of devices may exist that may each individually be considered an encrypting device (e.g., encrypting device (102)) in the context of actions taken by that device with respect to any particular network traffic data unit. For example, any network device capable of performing the processes and actions described above may be considered an encrypting device (e.g., encrypting device (102)) when performing any one of those processes.

In one or more embodiments, a network (e.g., network (104)) is a collection of connected network devices (not shown) that allow for the communication of data from one network device (not shown) to other network devices (not shown), or the sharing of resources among network devices (not shown). Examples of a network (e.g., network (104)) include, but are not limited to, a local area network (LAN), a wide area network (WAN) (e.g., the Internet), a mobile network, or any other type of network that allows for the communication of data and sharing of resources among network devices and/or devices operatively connected to the network (104). In one or more embodiments, the source device (e.g., source device (100)) is operatively connected to a network (e.g., network (104)) (e.g., via an encrypting device (102)).

In one or more embodiments, a decrypting device (e.g., decrypting device (106)) is any hardware (e.g., circuitry), or a combination of hardware and software, capable of receiving data, processing the data to obtain modified data, and transmitting the data. Further, in one or more embodiments, a decrypting device (e.g., decrypting device (106)) may be a network device. The modification performed by a decrypting device (e.g., decrypting device (106)) may be of any type that transforms the data from one form to another (e.g., encryption, decryption, appending of headers and/or tails, addition and/or removal of tags and/or identifiers, authentication, verification, etc.). Further, in one or more embodiments, the decryption performed by the decrypting device (e.g., decrypting device (106)) may be similar to, or some variation of, MACsec as standardized in IEEE 802.1AE. In one or more embodiments, a decrypting device (e.g., decrypting device (106)) may modify only a portion of the data that the encrypting device (e.g., encrypting device (102)) is provided (e.g., modifying only a payload, but not forwarding information). Alternatively, in one or more embodiments, a decrypting device (e.g., decrypting device (106)) may modify both a portion of the data which the decrypting device (e.g., decrypting device (106)) is provided and forwarding information (e.g., modifying a payload and tunneling headers or the identifier). Additionally, in one or more embodiments, a decrypting device (e.g., decrypting device (106)) may be capable of transmitting or causing the transmission of the data to another device or component after modification. In one or more embodiments, the decrypting device (e.g., decrypting device (106)) is operatively connected to a network (e.g., network (104)). In one or more embodiments, a decrypting device (e.g., decrypting device (106)) is capable of performing all of the functions of an encrypting device (e.g., encrypting device (102)), as described above. And, conversely, in one or more embodiments, an encrypting device (e.g., encrypting device (102)) is capable of performing all of the functions of a decrypting device (e.g., decrypting device (106)), as described above.

Although not shown, there may exist more than one decrypting device (e.g., decrypting device (106)). In one or more embodiments, a plurality of devices may exist that may each individually be considered a decrypting device (e.g., decrypting device (106)) in the context of actions taken by that device with respect to any particular network traffic data unit. For example, any network device capable of performing the processes and actions described above may be considered a decrypting device (e.g., decrypting device (106)) when performing any one of those processes.

In one or more embodiments, a destination device (e.g., destination device (108)) is a network device (as described above with respect to source device (100)). Further, in one or more embodiments, a destination device (e.g., destination device (108)) is a device that is the last device to receive a network traffic data unit. Alternatively, in one or more embodiments, a destination device (e.g., destination device (108)) is another intermediary device that transmits data to yet another device. In one or more embodiments, the destination device (e.g., destination device (108)) may be any computing system that includes functionality to communicate with the source device (e.g., source device (100)) via an operative connection (e.g., via at least a network (104)). More specifically, the destination device (e.g., destination device (108)) may include functionality to receive network traffic data units that originated from a source device (e.g., source device (100)). Examples of a destination device (e.g., destination device (108)) include, but are not limited to, a desktop computer, a laptop computer, a tablet computer, a server, a smartphone, a personal digital assistant (PDA), a network device, etc. In one or more embodiments, the destination device (e.g., destination device (108)) is operatively connected to a network (e.g., network (104)) (e.g., via a decrypting device (106)).

Although not shown, there may exist more than one destination device (e.g., destination device (108)). In one or more embodiments, a destination device (e.g., destination device (108)) is any network device that is the last device to receive a network traffic data unit. For example, a plurality of devices may exist that may each individually be considered a destination device (e.g., destination device (108)), relative to any particular network traffic data unit received by that destination device (e.g., destination device (108)).

Although not shown, a source device (e.g., source device (100)) may be operatively connected to an encrypting device (e.g., encrypting device (102)) through a network (not shown), as described above. Further, although not shown, a decrypting device (e.g., decrypting device (106)) may be operatively connected to a destination device (e.g., destination device (108)) through a network (not shown), as described above.

While FIG. 1 shows a configuration of devices and/or components, other configurations may be used without departing from the scope of the disclosure. For example, although source device (100) and encrypting device (102) are shown as two separate devices, one of ordinary skill in the art, having the benefit of this Detailed Description, would appreciate that both the source device (100) and encrypting device (102) may be the same device. Similarly, although destination device (108) and decrypting device (106) are shown as two separate devices, one of ordinary skill in the art, having the benefit of this Detailed Description, would appreciate that both the destination device (108) and decrypting device (106) may be the same device. Further, although FIG. 1 shows a configuration where the encrypting device (102) and the decrypting device (106) are connected through network (104), one of ordinary skill in the art, having the benefit of this Detailed Description, would appreciate that the encrypting device (102) and the decrypting device (106) may be operatively connected without an intervening devices (which may be used, for example, in a situation where the physical connection between the encrypting device (102) and the decrypting device (106) is exposed to the public). Accordingly, embodiments disclosed herein should not be limited to the configuration of devices and/or components shown in FIG. 1.

Figure 2:
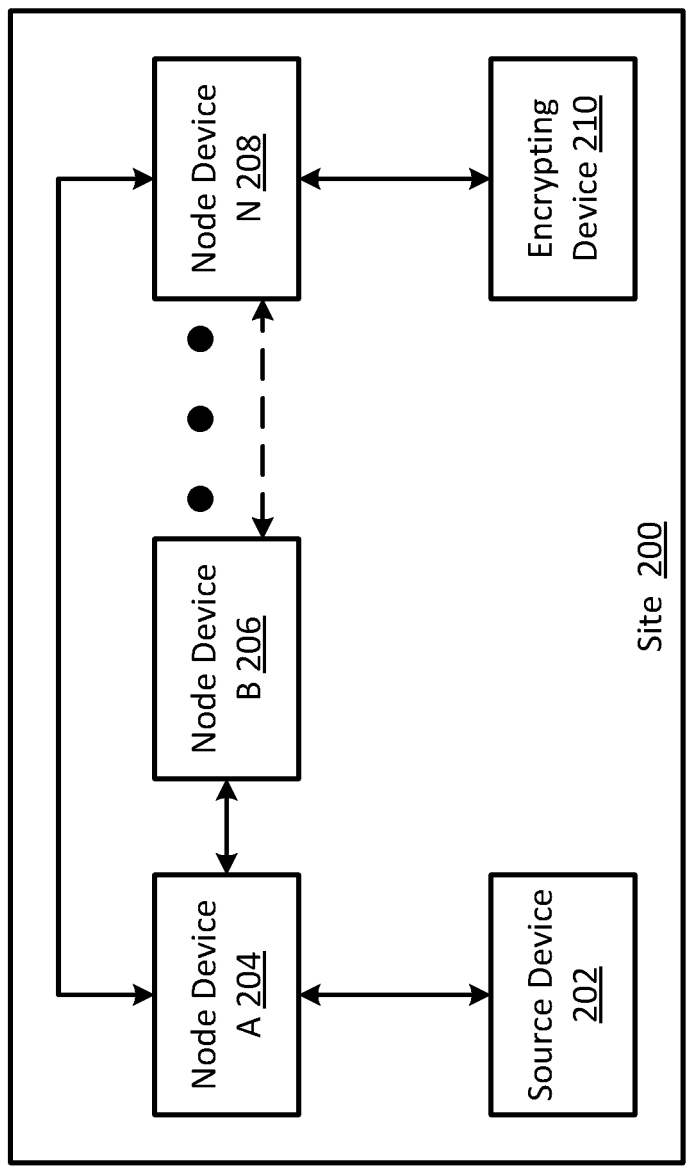
FIG. 2 shows a system in accordance with one or more embodiments.

FIG. 2 shows a system in accordance with one or more embodiments. In one or more embodiments, the system is a site (200) that includes a source device (202), node device A (204), node device B (206), node device N (208), and an encrypting device (210). Each of these devices is described below.

In one or more embodiments, a site (e.g., site (200)) may be any network device or collection of networks devices operatively linked to each other. A site may share a common physical property (e.g., proximity and/or placement within a single facility (i.e., a datacenter)) and/or network devices of the same site may share a common network property (e.g., a common subnet, a shared virtual tunnel, and/or user defined characteristics).

In one or more embodiments, a node device (e.g., node device A (204), node device B (206), and node device N (208)) is a network device (as described above with respect to source device (100) of FIG. 1).

In one or more embodiments, a source device (e.g., source device (202)) is connected to an encrypting device (e.g., encrypting device (210)) without any intervening devices, however, in one or more other embodiments, one or more node devices (e.g., node device A (204), node device B (206), and node device N (208)) may separate the source device (e.g., source device (202)) and the encrypting device (e.g., encrypting device (210)). That is, between the source device (e.g., source device (202)) and the encrypting device (e.g., encrypting device (210)), there may lie any number of node device(s) (e.g., node device A (204), node device B (206), and node device N (208)) through which a network traffic data unit is intended to traverse (e.g., via an operative connection).

In one or more embodiments, as described above with respect to FIG. 1, although not shown, there may exist more than one source device (e.g., source device (202)) and/or more than one encrypting device (e.g., encrypting device (210)). For example, a plurality of source devices (not shown) may exist that each individually generate a network traffic data unit; and a plurality of encrypting devices (not shown) may exist that each individually encrypt a network traffic data unit. Further, in one or more embodiments, a single device may be considered a source device (e.g., source device (202)), a node device (e.g., node device A (204), node device B (206), and node device N (208)), or an encrypting device (e.g., encrypting device (210)) depending on the actions and/or processes performed by the device on a particular network traffic data unit.

In one or more embodiments, network traffic data units traverse the devices (e.g., source device (202), node device A (204), node device B (206), node device N (208), and encrypting device (210)) of site (200) via any routing technique appropriate for site (200). For example, a source device (e.g., source device (202)) may generate a network traffic data unit and append a series of unique forward segments to the network traffic data unit that specify the exact path the network traffic data unit is intended to traverse (e.g., via an MPLS scheme). For example, in one or more embodiments, a network traffic data unit may be appended with three forward segments, where the first forward segment indicates that the network traffic data unit is intended to traverse node device A (204), the second forward segment indicates that the network traffic data unit is intended to traverse node device N (208), and the third forward segment indicates that the network traffic data unit is intended to traverse the encrypting device (210). Thus, as the network traffic data unit was given three headers that specified a particular path, the network traffic data unit is able to bypass node device B (206) and still arrive at encrypting device (210).

While FIG. 2 shows a configuration of devices and/or components, other configurations may be used without departing from the scope of the disclosure. For example, although only three distinct node devices are shown (node device A (204), node device B (206), and node device N (208)), one of ordinary skill in the art, having the benefit of this Detailed Description, would appreciate that any number of node devices may exist within site (200). Further although only limited number of connections between node devices is disclosed (the direct operative connection between node A (204) and node device B (206), and the direct operative connection between node A (204) and node device N (208)), one of ordinary skill in the art, having the benefit of this Detailed Description, would appreciate that any number of direct operative connections may exist between any nodes (shown or otherwise) and between the source device (202) and the encrypting device (210). Accordingly, embodiments disclosed herein should not be limited to the configuration of devices and/or components shown in FIG. 2.

Figure 3:
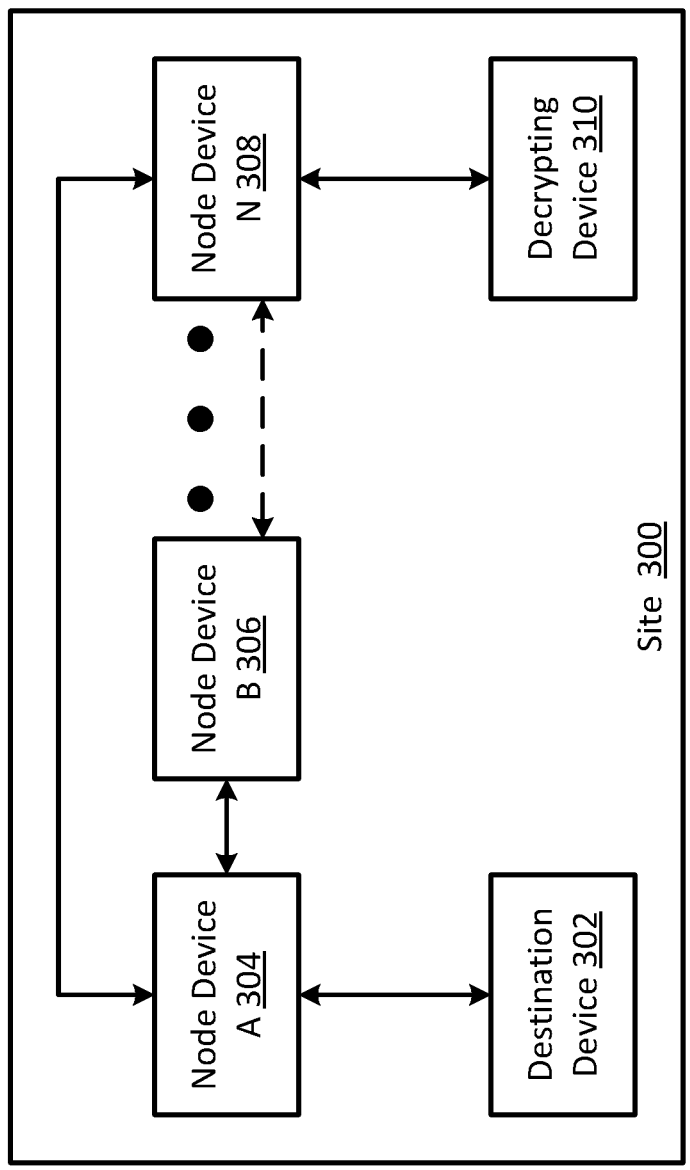
FIG. 3 shows a system in accordance with one or more embodiments.

FIG. 3 shows a system in accordance with one or more embodiments. In one or more embodiments, the system is a site (300) that includes a destination device (302), node device A (304), node device B (306), node device N (308), and a decrypting device (310). Each of these devices is described below.

In one or more embodiments, a site may be any network device or collection of networks devices operatively linked to each other. A site may share a common physical property (e.g., proximity and/or placement within a single facility (i.e., a datacenter)) and/or network devices of the same site may share a common network property (e.g., a common subnet, a shared virtual tunnel, and/or user defined characteristics).

In one or more embodiments, a destination device (e.g., destination device (302)) is operatively connected to a decrypting device (e.g., decrypting device (310)) without any intervening devices, however, in one or more embodiments, one or more node devices may separate the destination device (e.g., destination device (302)) and the decrypting device (e.g., decrypting device (310)). For example, between the destination device (e.g., destination device (302)) and the decrypting device (e.g., decrypting device (310)), there may lie one or more node device(s) (e.g., node device A (304), node device B (306), and node device N (308)) through which a network traffic data unit is intended to traverse.

In one or more embodiments, as described above with respect to FIG. 1, although not shown, there may exist more than one destination device (e.g., destination device (302)) and/or more than one decrypting device (e.g., decrypting device (310)). For example, a plurality of destination devices (not shown) may exist that each individually receive a network traffic data unit; and a plurality of decrypting devices (not shown) may exist that each individually decrypt a network traffic data unit. Further, in one or more embodiments, a single device may be considered a destination device (e.g., destination device (302)), a node device (e.g., node device A (304), node device B (306), and node device N (308)), or a decrypting device (e.g., decrypting device (310)) depending on the actions and/or processes performed by the device on a particular network traffic data unit.

In one or more embodiments, network traffic data units traverse the devices (e.g., destination device (302), node device A (304), node device B (306), node device N (308), and decrypting device (310)) of site (300) via any routing technique appropriate for site (300). For example, a decrypting device (e.g., decrypting device (310)) may receive an encrypted network traffic data unit and decrypt the network traffic data unit. In one or more embodiments, after the network traffic data unit is decrypted, there may exist forward segments that specify a particular path through site (300). For example, in one or more embodiments, a network traffic data unit may be appended with three forward segments, where the first forward segment indicates that the network traffic data unit is intended to traverse node device N (308), the second forward segment indicates that the network traffic data unit is intended to traverse node device A (304), and where the third forward segment indicates that the network traffic data unit is intended to arrive at the destination device (302). Thus, as the network traffic data unit was given three forward segments that specified a particular path, the network traffic data unit is able to bypass node device B (306) and still arrive at destination device (302).

While FIG. 3 shows a configuration of devices and/or components, other configurations may be used without departing from the scope of the disclosure. For example, although only three distinct node devices are shown (node device A (304), node device B (306), and node device N (308)), one of ordinary skill in the art, having the benefit of this Detailed Description, would appreciate that any number of node devices may exist within site (300). Further although only a limited number of connections between node devices is disclosed (the direct operative connection between node A (304) and node device B (306), and the direct operative connection between node A (304) and node device N (308)), one of ordinary skill in the art, having the benefit of this Detailed Description, would appreciate that any number of direct operative connections may exist between any nodes (shown or otherwise) and between the destination device (302) and the decrypting device (310). Accordingly, embodiments disclosed herein should not be limited to the configuration of devices and/or components shown in FIG. 3.

Figure 4:
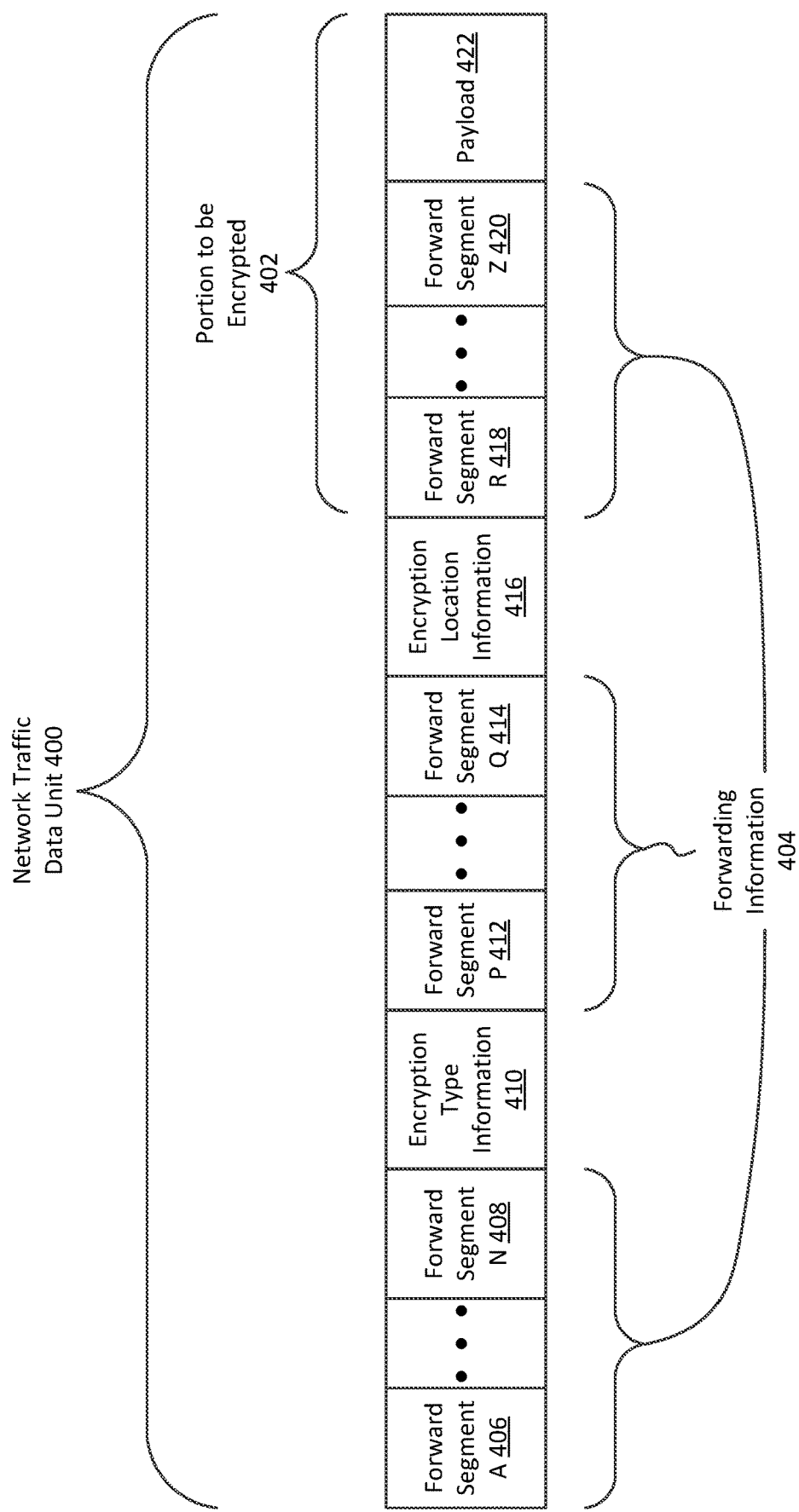
FIG. 4 shows a system in accordance with one or more embodiments.

FIG. 4 shows a network traffic data unit, as obtained by a source device, according to one or more embodiments. In one or more embodiments, a network traffic data unit (400) includes forwarding information (404) (which itself includes forward segment A (406), forward segment N (408), forward segment P (412), forward segment Q (414), forward segment R (418), and forward segment Z (420)), encryption type information (410), encryption location information (416), and a portion to be encrypted (402) (which itself includes forward segment R (418), forward segment Z (420), and payload (422)). Each of these components is described below.

In one or more embodiments, forwarding information (e.g., forwarding information (404)) is data appended to a network traffic data unit that indicates to a network device to utilize a specific routing technique when handling that network traffic data unit (e.g., network traffic data unit (400)). One of ordinary skill in the art, having the benefit of this Detailed Description, would appreciate that the forwarding information may take many forms including, but not limited to, headers, tails, and/or identifiers, which are collectively termed herein as 'forward segments' of the forwarding information (e.g., forwarding information (404)). In one or more embodiments, the forwarding information (404) may include an Ethernet frame (or any other protocol for network transmission) instead of, or in addition to, the forward segments (e.g., forward segment A (406), forward segment N (408), forward segment P (412), forward segment Q (414), forward segment R (418), and forward segment Z (420)).

In one or more embodiments, the forward segments (e.g., forward segment A (406), forward segment N (408), forward segment P (412), forward segment Q (414), forward segment R (418), and forward segment Z (420)) appended to the network traffic data unit may specify the exact path through one or more networks the network traffic data unit must traverse.

In one or more embodiments, the forwarding information (404) is broken into portions (e.g., clusters of forward segments), where each portion of forwarding information (404) is specific to a different network the network traffic data unit (400) is going to traverse. For example, forward segment A (406) and forward segment N (408) may indicate specific nodes the network traffic data unit is intended to traverse through a local site (e.g., a local area network) to arrive at an encrypting device in the local site. Forward segment P (412) and forward segment Q (414) may indicate specific nodes to traverse over a public network (after the network traffic data unit is encrypted) to arrive at a decrypting device inside a second local site (e.g., a local area network). And, forward segment R (418) and forward segment Z (420) may indicate specific nodes to traverse through the second local site (after the network traffic data unit is decrypted). Alternatively, in one or more embodiments, forward segment A (406) and forward segment N (408) may indicate specific nodes the network traffic data unit is intended to traverse through a local site (e.g., a local area network) to arrive at an encrypting device in the local site, where the last forward segment of that portion (e.g., forward segment N (408)) indicates a network device to traverse after traversing the encrypting device (e.g., in a different network than the local site that includes the encrypting device).

In one or more embodiments, forwarding information (404), and/or one or more portions of the forwarding information (404), may indicate that the network traffic data unit (400) is to traverse several distinct virtual tunnels. For example, each portion of forwarding information (404) may independently specify an individual tunnel and/or routing technique through a virtual tunnel which the network traffic data unit (400) is directed to traverse.

In one or more embodiments, the portions of the forwarding information (404) may be indicated by the location of the encryption type information (410) and the encryption location information (416). For example, any forward segments coming before the encryption type information (410) (e.g., forward segment A (406) and forward segment N (408)) may relate to the network (e.g., site) that includes the source device and the encrypting device. Further, the forward segments located between the encryption type information (410) and the encryption location information (416) (e.g., segment P (412) and forward segment Q (414)) may relate a public network up to and including the decrypting device (as may be specified by forward segment Q (414)). Lastly, the forward segments located after the encryption location information (416) (forward segment R (418) and forward segment Z (420)) may relate to the network (e.g., site) that includes the decrypting device and the destination device.

In one or more embodiments, the last forward segment (i.e., forward segment Z (420)) is indicated as the last forward segment by setting a bottom-of-stack (BOS) bit to indicate that the particular segment is the last in the network traffic data unit (400). However, in one or more embodiments, as the last forward segment (i.e., forward segment Z (420)) of the forwarding information is going to be encrypted (and thus unreadable while traversing, for example, a public network), the BOS bit of the last unencrypted segment (i.e., encryption location information (416)) needs to be set. Accordingly, while the network traffic data unit (400) is encrypted, the last in-the-clear (i.e., unencrypted) segment (i.e., encryption location information (416)) is indicated as the last segment (even though forward segments exist further into the encrypted network traffic data unit, albeit in encrypted form). Thus, in one or more embodiments, two separate segments (encryption location information (416)) and forward segment Z (420)) may both have their BOS bit set simultaneously. In one or more embodiments, the source device may set both BOS bits, or alternatively, in one or more embodiments, the encrypting device may set the BOS bit of the last unencrypted segment (i.e., encryption location information (416)) prior to, during, or after encryption.

In one or more embodiments, the encryption type information (410) indicates (i) the type of encryption to be used by the encrypting device, (ii) encryption parameters (e.g., cipher-suite, encryption keys, etc.), and/or what portion of the network traffic data unit is to be encrypted. For example, the encryption type information (410) may specify MACsec type security is to be used to encrypt the portion to be encrypted (402). In one or more embodiments, encryption type information may specify one or more security associations (e.g., MACsec Secure Channel Identifier (SCI), encryption key, etc.) to use when encrypting some or all of a network traffic data unit. One of ordinary skill in the art, having the benefit of this Detailed Description, would appreciate that any type of suitable encryption may be used to encrypt the portion to be encrypted (402). In one or more embodiments, where the source device and the encrypting device are the same device, encryption type information is never generated and/or obtained as such information may be communicated directly to the encrypting device and never transmitted via a network traffic data unit.

In one or more embodiments, encryption location information (416) indicates a location where the encrypting device should begin encrypting the network traffic data unit (400) (e.g., the portion to be encrypted (402)). In one or more embodiments, the encryption location information (416) indicates the beginning of the portion to be encrypted (402) by the encryption location information's (416) position. For example, an encrypting device may be configured to identify the encryption location information (416) and further be configured to encrypt all data of the network traffic data unit (400) located after the encryption location information (416).

Alternatively, in one or more embodiments, the encryption location information (416) may indicate the portion to be encrypted (402) by data stored in the encryption location information (416). For example, the encrypting device may be configured to identify and read the encryption location information (416), where the encryption location information (416) specifies which data of the network traffic data unit (400) is to be encrypted.

In one or more embodiments, the portion to be encrypted (402) includes forwarding information (404) (forward segment R (418) and forward segment Z (420)) and a payload (422). One of ordinary skill in the art, having the benefit of this Detailed Description, would appreciate that the portion to be encrypted (402) does not need to include forwarding information (404), but rather, the portion to be encrypted (402) may only include a payload (e.g., payload (422)).

As described above in the description of the encryption location information (416), the beginning of the portion to be encrypted (402) is determined by the encryption location information (416), and the end of the portion to be encrypted (402) is determined by either (i) the end of the network traffic data unit (400) or, (ii) as specified by the encryption location information (416).

In one or more embodiments, the payload (422) includes the data that is intended to reach the destination device. For example, the payload (422) may include user data requested by the destination device but stored by the source device. Thus, in one or more embodiments, the source device generates the network traffic data unit (400) with all appropriate forward segments and encryption information so as to securely deliver the payload to the destination device.

In one or more embodiments, the payload may itself be a network traffic data unit (400). For example, the payload may include Ethernet headers, IP headers, user data, a separate encryption scheme, specifications for routing via another technique, and/or any other form of data.

While FIG. 4 shows a specific configuration of a network traffic data unit (400), other configurations may be used without departing from the scope of the disclosure. For example, although only forwarding information (404) is shown as discrete forward segments, one of ordinary skill in the art, having the benefit of this Detailed Description, would appreciate that any form of forwarding information (404) may be used. For example, instead of specific forward segments which specify the exact nodes the network traffic data unit (400) is intended to traverse to go from the source device to the encrypting device (forward segment A (406) and forward segment N (408)), that portion of the forwarding information (404) may be replaced with a traditional Ethernet header that may be used by network devices to transmit the network traffic data unit (400) to an encrypting device. Accordingly, embodiments disclosed herein should not be limited to the configuration of devices and/or components shown in FIG. 4.

Figure 5:
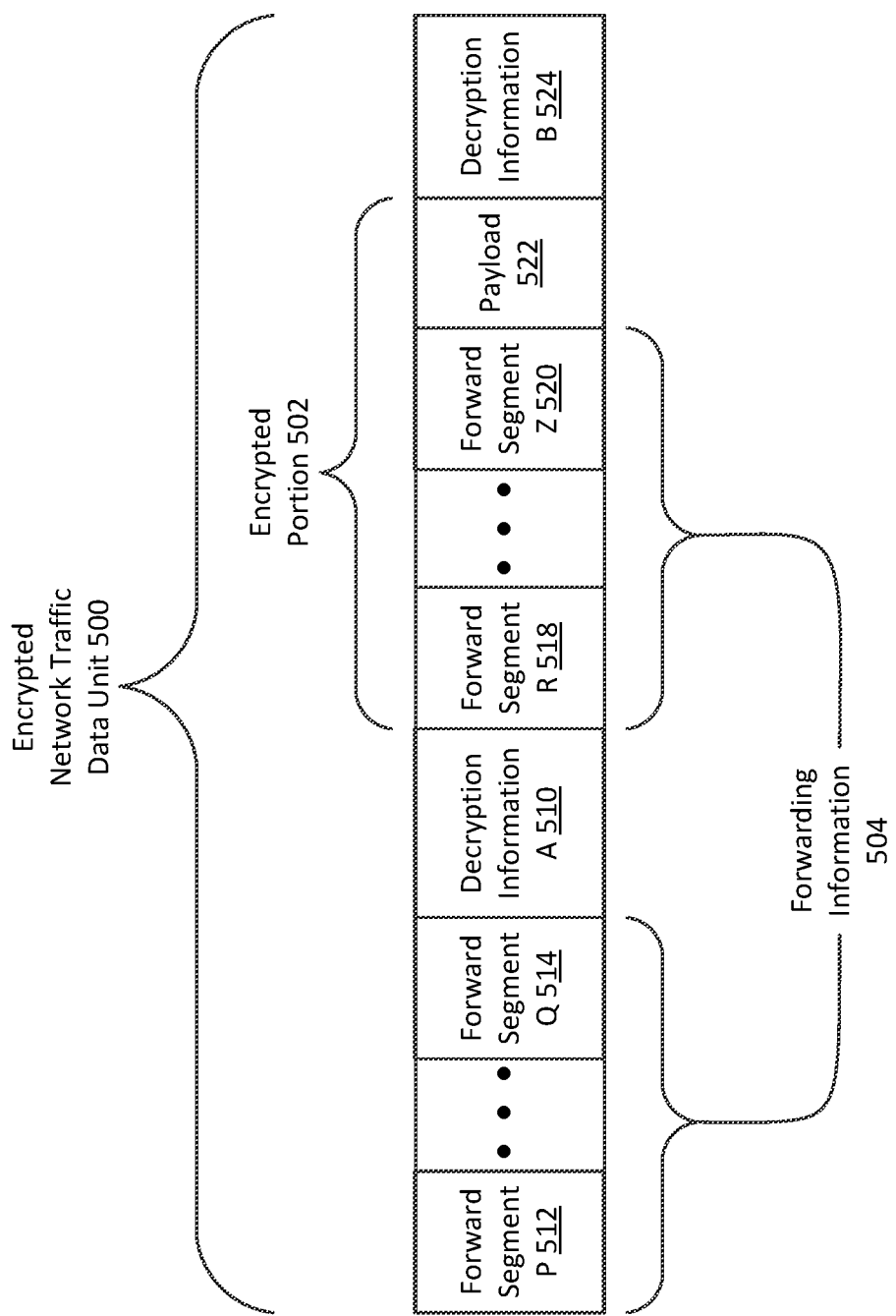
FIG. 5 shows a system in accordance with one or more embodiments.

FIG. 5 shows an encrypted network traffic data unit (500), in a form when leaving a site, which includes the source device, and entering a public network, according to one or more embodiments. In one or more embodiments, an encrypted network traffic data unit (500) includes forwarding information (504) (which further includes forward segment P (512), forward segment Q (514), forward segment R (518), and forward segment Z (520)), encryption location information (not shown), decryption information A (510), decryption information B (524), and an encrypted portion (502). Further, the encrypted portion (502) includes a payload (522), forward segment R (518), and forward segment Z (520). Each of these components is described below.

In one or more embodiments, the decryption information (e.g., decryption information A (510) and decryption information B (524)) is appended to the encrypted network traffic data unit (500) during, or immediately after, the encryption of the network traffic data unit by the encrypting device. In one or more embodiments, the decryption information (e.g., decryption information A (510) and decryption information B (524)) specifies information necessary for the decrypting device to be able to decrypt the encrypted portion (502) of the encrypted network traffic data unit (500).

In one or more embodiments, the decryption information (e.g., decryption information A (510) and decryption information B (524)) may provide and/or specify (i) the type of encryption used (e.g., MACsec type encryption), (ii) replay protection, (iii) and/or an integrity check value (ICV) for the encrypted network traffic data unit (500). In one or more embodiments, decryption information A (510) specifies (i) the type of encryption used and (ii) the replay protection, whereas decryption information B (524) specifies (iii) the ICV. One of ordinary skill in the art, having the benefit of this Detailed Description, would appreciate that the any of (i) the type of encryption used, (ii) replay protection, and/or (iii) the ICV may be specified and/or provided by both decryption information A (510) and/or decryption information B (524), or some variation thereof.

In one or more embodiments, decryption information (e.g., decryption information A (510) and decryption information B (524)) may further provide and/or specify a unique identifier (e.g., packet number, sequence number) for the encrypted network traffic data unit in a unique identifier range (e.g., sequence number space, packet number space) such that the encrypted network traffic data unit is uniquely identifiable from other encrypted network traffic data units, including those encrypted by and/or emanating from other encrypting devices. In one or more embodiments, for some cipher-suites (e.g., AES-GCM), privacy cannot be assured unless an identifier is unique for every network traffic data unit that share the same security association (e.g., MACsec SCI, encryption key, etc.). In one or more embodiments, the unique identifier may allow two or more encrypted network traffic data units to be placed in a sequence based on the respective values of the unique identifier within the decryption information of each encrypted network traffic data unit. Accordingly, in one or more embodiments, the unique identifier allows for individual identification, grouping, and/or ordering of encrypted network traffic data units among one or more concurrently communicating network devices (e.g., encrypting devices, decrypting devices).

In one or more embodiments, as described above in the description of FIGS. 1-2, two or more encrypting devices may, simultaneously, be encrypting network traffic data units and simultaneously transmitting those encrypted network traffic data units to one or more decrypting devices. However, in one or more embodiments where (i) each encrypting device is communicating with the decrypting device at a fast rate (e.g., 100 Gb/s), (ii) multiple encrypting devices are using the same encryption key, and (iii) the unique identifier range is not sufficiently large (e.g., 32-bits), the decrypting device would be unable to uniquely identify and/or order the encrypted network traffic data units. For example, at 100 Gb/s and assuming an average packet size of 1500 bytes, a 32-bit unique identifier range would have to reset and begin incrementing from the first bit (e.g., "rollover") in less than 10 minutes. Further, considering multiple encrypting devices (e.g., 256 encrypting devices) may be communicating with the decrypting device, each resetting their unique identifier at irregular intervals, the decrypting device would be unable to properly identify each encrypted network traffic data unit (256 encrypting devices, using the same 32-bit unique identifier range, would likely require a reuse of a unique identifier in short period of time (e.g., less than 1 second)).

Accordingly, in one or more embodiments, if the unique identifier range is made sufficiently large (e.g., 64-bit), each encrypting device may be able to use some unique portion of the unique identifier range such that each encrypted network traffic data unit remains independently identifiable (at 100 Gb/s and assuming an average packet size of 1500 bytes, a 64-bit unique identifier range would not have to reset and begin incrementing from the first bit (e.g., "rollover") for a longer period of time (e.g., one or more years)).

In one or more embodiments, an encrypting device may partition a sufficiently large unique identifier range into multiple sub-ranges (e.g., a first sub-range, a second sub-range, etc.), thereby allowing for the unique identification of multiple properties of an encrypted network traffic data unit. For example, in one or more embodiments, when multiple encrypting devices are concurrently encrypting and transmitting encrypted network traffic data units, a first sub-range of the unique identifier range may be allocated that is sufficiently large enough to uniquely identify each of the encrypting devices.

Further, in one or more embodiments, where multiple encrypting devices are concurrently encrypting and transmitting encrypted network traffic data units, each encrypting device may use a second sub-range of the unique identifier range to provide unique identifiers to each encrypted network traffic data unit. In one or more embodiments, an encrypting device may use only a portion of the second sub-range (that will remain unused by any other concurrently operating encrypting devices) to uniquely identify encrypted network traffic data units.

Accordingly, in one or more embodiments, as the portion of the second sub-range utilized by one encrypting device is unique to that encrypting device, any reuse of bits within that range uniquely indicates a rollover of network traffic data units emanating from that one encrypting device. Thus, in one or more embodiments, where each encrypting device uses a unique portion of the second sub-range, one or more decrypting devices may be configured to recognize each of portion of the second sub-range of the unique identifier range and therefore maintain unique identification, grouping, and/or ordering of encrypted network traffic data units without having to further process any of the received encrypted network traffic data unit.

In one or more embodiments, prior to and/or once the unique portion of the second sub-range is exhausted (e.g., every unique identifier has been used), thus necessitating the security association and associated encryption key to be changed, that unique portion of the second sub-range needs to be reset (e.g., rolled over). Accordingly, in one or more embodiments, the encrypting device unique to that portion of the second sub-range is configured to initiate renegotiation of the security association (e.g., MACsec SCI, encryption key, etc.) used to encrypt and/or decrypt network traffic data units. In one or more embodiments, renegotiation of the security association (e.g., MACsec SCI, encryption key, etc.) is only initiated by the encrypting device, but is ultimately performed by software independent of the encrypting device(s). Accordingly, in one or more embodiments, the security association (e.g., MACsec SCI, encryption key, etc.) may be renegotiated more frequently than a time interval supported by the second-subrange and/or more frequently than the portion of the second sub-range needs to be reset (e.g., at regular intervals, or as new encryption keys become available). Alternatively, in one or more embodiments, as the portion of the second sub-range may not need to be reset for many years, the security association (e.g., MACsec SCI, encryption key, etc.) may also be used for a similar duration of time. Further, in one or more embodiments, where the number of security associations (e.g., MACsec SCI, encryption key, etc.) are limited (e.g., where there are less encryption keys than unique pairs of encrypting devices and decrypting devices), the same security association (e.g., MACsec SCI, encryption key, etc.) may be used by multiple pairs of encrypting devices and decrypting devices. Further, in one or more embodiments, as each encrypted network traffic data unit is uniquely identifiable in the second sub-range, security of the encrypted network traffic data unit is maintained, even though the same security association (e.g., MACsec SCI, encryption key, etc.) is in concurrent use among multiple encrypting devices and decrypting devices.

In one or more embodiments, where multiple encrypting devices are concurrently encrypting and transmitting encrypted network traffic data units to a single decrypting device, for verification of proper use of the unique identifier range, the decrypting device may determine if any unique portion of the second sub-range of the unique identifier range (associated with a single encrypting device) is nearing a reset or has exceeded its allocated portion of the second sub-range. Accordingly, in one or more embodiments, the decrypting device may initiate renegotiation of one or more security associations (e.g., MACsec SCI, encryption key, etc.) used by the encrypting and decrypting devices.

In one or more embodiments, consider an example where 256 different encrypting devices are concurrently encrypting and transmitting encrypted network traffic data units to a single decrypting device, and only a single encryption key is used by the encrypting and decrypting devices. A unique identifier range that is sufficiently large (e.g., 64-bit total) is added to the decryption information, where a first sub-range of 8 bits is allocated to uniquely identify each encrypting device (8 bits allows for 256 unique identifiers). Then, continuing with the example, the remaining 56 bits of the unique identifier range are used to create a second sub-range to track and uniquely identify individual encrypted network traffic data units. Specifically, in one or more embodiments, for the remaining 56 bits of the unique identifier range (able to uniquely identify over 72 quadrillion encrypted network traffic data units), each of the 256 encrypting devices is allocated their own non-overlapping portion of the second sub-range to track encrypted network traffic data units (over 281 trillion each) emanating from each encrypting device. Continuing with the example, in one or more embodiments, once an encrypting device determines that its unique portion of the second sub-range is nearly exhausted (e.g., via some threshold determination that most of its unique portion of the second sub-range has been used), the encrypting device will initiate a renegotiation of the security association (e.g., MACsec SCI, encryption key, etc.) shared by the encrypting device and decrypting device. Once the new security association (e.g., MACsec SCI, encryption key, etc.) is negotiated, the unique portion of the second sub-range may be reset to begin uniquely identifying encrypted network traffic data units using previously-used unique identifiers (albeit with a different security association (e.g., MACsec SCI, encryption key, etc.)).

Alternatively, in one or more embodiments, the unique identifier allows one or more decrypting devices to identify network traffic data units that have been delayed or replayed. In one or more embodiments where (i) each encrypting device is communicating with the decrypting device at a fast rate (e.g., 100 Gb/s), (ii) the unique identifier range is not sufficiently large (e.g., 32-bits), the unique identifier range may be exhausted very quickly requiring the security association (e.g., MACsec SCI, encryption key, etc.) to be reset (e.g., updated to a new security association). For example, at 100 Gb/s and assuming an average packet size of 150 bytes, a 32-bit unique identifier range may be exhausted in less than 1 minute. Accordingly, in one or more embodiments, one or more encrypting devices may maintain a larger (e.g., 64-bit) unique identifier range, but transmit only lower portion of that larger unique identifier range (e.g., a 'lower' 32 bits) for the purpose of uniquely identifying a network traffic data unit. In one or more embodiments, the decrypting device infers and/or is otherwise able to determine the other, unsent, upper portion of the large unique identifier range (e.g., the 'upper' 32 bits) when the decrypting device detects that the lower portion of the unique identifier range has been reset and begun incrementing from the first bit (e.g., "rollover").

Along those lines, in one or more embodiments, as described above in the description of FIGS. 1-2, two or more encrypting devices may, simultaneously, be encrypting network traffic data units and simultaneously transmitting those encrypted network traffic data units to one or more decrypting devices. Accordingly, in one or more embodiments, by using a unique portion of the unique identifier range, two or more encrypting devices are able to share the same security association (e.g., MACsec SCI, encryption key, etc.) and still ensure the security of each encrypted network traffic data unit. To accomplish this, in one or more embodiments, a large unique identifier range (e.g., 64 bits) may be partitioned into smaller ranges (e.g., 56 bits) to allow each of the smaller ranges to be used by a single encryption engine.

In one or more embodiments, when one or more encrypting devices are sharing the same security association (e.g., MACsec SCI, encryption key, etc.), one or more encrypting devices may send only lower portion of the larger unique identifier range (e.g., a 'lower' 32 bits) with the encrypted network traffic data unit. Accordingly, the decrypting device would need some mechanism to infer and/or is otherwise a determine the other, unsent, upper portion of the large unique identifier range (e.g., the 'upper' 32 bits). Accordingly, in one or more embodiments, when sharing security association with other encrypting engines or encrypting devices, one or more encrypting device will transmit a sufficient number of bits of the unique identifier (e.g., all 64 bits) with the encrypted network traffic data units, so that the decrypting device directly receives an identifier that is unique to the transmitting encrypting device and/or encrypted network traffic data units. Accordingly, in one or more embodiments, the decrypting device is configured to directly construct the unique identifier from the total unique identifier (e.g., all 64 bits), instead of inferring the unique identifier from context associated with the security association (e.g., 'lower' and 'upper' bits). That is, in one embodiment, some portion of the unique identifier range in the network traffic data unit may include the upper bits of the unique identifier (those bits that would otherwise need to be inferred by the decrypting engine). For example, in one or more embodiments, bits of the SCI field of a MACsec header are used to explicitly carry the upper bits of the unique identifier that would otherwise be inferred by the decrypting engine.

Accordingly, in one or more embodiments, if the unique identifier range for each encryption engine is made sufficiently large (e.g., 56-bit), each encrypting device may be able to use some unique portion of the unique identifier range such that the same security association can be used for a long time (e.g. at 100 Gb/s and assuming an minimum packet size of 64 bytes, a 56-bit unique identifier range would allow the same security association to be safely used for 15 years).

In one or more embodiments, the encrypted portion (502) is the part of the encrypted network traffic data unit (500) that was modified by the encrypting device. In one or more embodiments, the encrypted portion (502) is modified so that the content of the encrypted portion (502) is obscured and unreadable without first being decrypted. Accordingly, network devices are unable to read and/or modify data included in the encrypted portion (502).

In one or more embodiments, as shown, forward segment R (518), forward segment Z (520), and payload (522) are part of the encrypted portion (502) and are thus encrypted. Accordingly, network devices are unable to read and/or modify forward segment R (518), forward segment Z (520), and payload (522). Thus, as the encrypted network traffic data unit (500) traverses a public network, a network device of that public network would not be able to identify forward segment R (518), forward segment Z (520), and payload (522) (included in encrypted portion (502)) without first decrypting the encrypted portion (502).

In one or more embodiments, as forward segment P (512) and forward segment Q (514) are outside the encrypted portion (502) and thus they are not encrypted. In one or more embodiments, network devices are capable of reading and modifying forward segment P (512) and forward segment Q (514). Thus, for example, forward segment P (512) and forward segment Q (514) may specify nodes of a public network over which the encrypted network traffic data unit (500) is intended to traverse. Therefore, in one or more embodiments, while the encrypted network traffic data unit (500) is traversing a public network, the encrypted portion (502) cannot be read, but forward segment P (512) and forward segment Q (514) (outside of the encrypted portion) may still specify a special routing technique and are thus used and removed after traversing each specified network device.

In one or more embodiments, forward segment Q (514) specifies the decrypting device. For example, forward segment Q (514) should specify the decrypting device as the device through which the encrypted network traffic data unit (500) is intended to traverse so that the encrypted network traffic data unit (500) can be decrypted and be forwarded towards the destination device.

In one or more embodiments, as described above in the description of FIG. 4, the encryption location information (not shown) is located after the last forward segment (e.g., forward segment Q (514)). Accordingly, as the encryption location information (not shown) follows (e.g., is located after) the last forward segment, encryption location information (not shown) may be indicated as the BOS segment, even though forward segment R (518) and forward segment Z (520) exist further into the encrypted network traffic data unit (500). In one or more embodiments, encryption location information (not shown) is indicated as the last segment (i.e., the BOS bit is set) because the last, actual, forward segment (i.e., forward segment Z (520)) is encrypted and thus not readable by network devices the encrypted network traffic data unit (500) traverses while encrypted.

In one or more embodiments, encryption location information (not shown) indicates that the encrypted portion (502) contains encrypted forwarding information (518, 520). In one or more embodiments, by indicating whether the encrypted portion (502) contains encrypted forwarding information (518, 520) or only an encrypted payload (522), proper interpretation of the decrypted payload may then be performed.

While FIG. 5 shows a specific configuration of an encrypted network traffic data unit (500), other configurations may be used without departing from the scope of the disclosure. Accordingly, embodiments disclosed herein should not be limited to the configuration of devices and/or components shown in FIG. 5.

Figure 7:
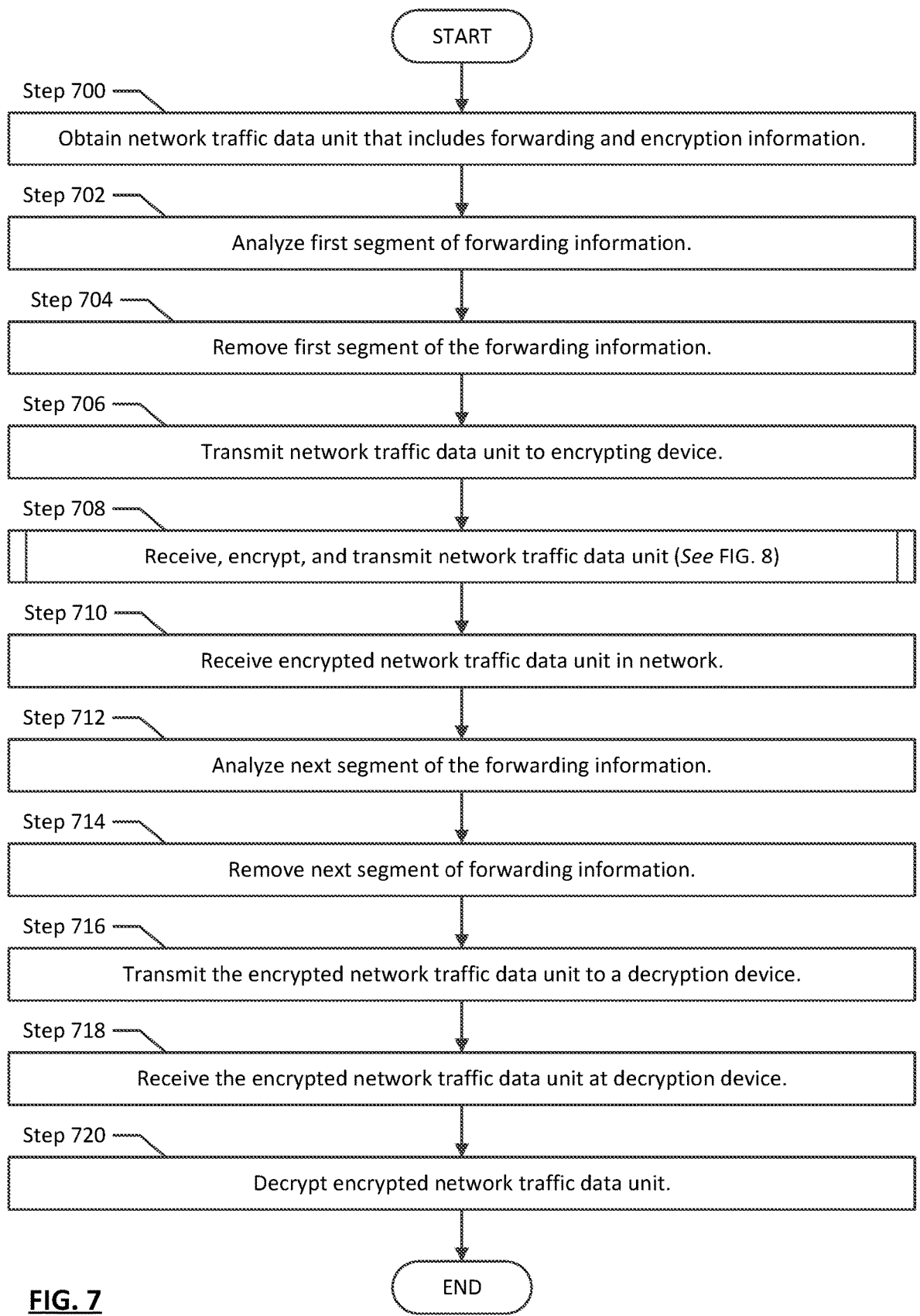
FIG. 7 shows a flowchart in accordance with one or more embodiments.

FIG. 7 shows a flowchart describing a path of a network traffic data unit from a source device to a destination device according to one or more embodiments. While the various steps in this flowchart are presented and described sequentially, one of ordinary skill in the art, having the benefit of this Detailed Description, would appreciate that some or all of the steps may be executed in different orders, may be combined or omitted, and some or all of the steps may be executed in parallel.

In Step 700, a network traffic data unit is obtained by a source device that further includes, (i) forwarding information, (ii) encryption type information, (iii) encryption location information, and (iv) a payload. The source device may generate the network traffic data unit itself, or receive the network traffic data unit from another device.

In one or more embodiments, the entirety of the network traffic data unit is not encrypted. In one or more embodiments, because the network traffic data unit was generated by the source device (and not yet received or processed by the encrypting device) all contents of the network traffic data unit are in-the-clear (i.e., unencrypted, not encrypted, or yet-to-be encrypted).

In one or more embodiments, the forwarding information of the network traffic data unit specifies one or more network devices (possibly over one or more networks) through which the network traffic data unit is intended to traverse. For example, a series of forward segments (e.g., an MPLS label stack) may be generated that specifies a series of particular network devices over one or more networks. Further, in one or more embodiments, the encryption location information is located such that the encryption location information indicates that a portion of the forwarding information is to be encrypted.

As described above in the description of FIG. 4 and the network traffic data unit shown therein, in one or more embodiments, the forwarding information is broken into portions (e.g., clusters of forward segments), where each portion of forwarding information is specific to a different network the network traffic data unit is going to traverse. In one or more embodiments, the portions of the forwarding information may be indicated by the location of the encryption type information (and the encryption location information). For example, any forward segments coming before the encryption type information may relate to the network (e.g., site) that includes the source device and the encrypting device. Further, the forward segments located between the encryption type information and the encryption location information may relate a public network up to and including the decrypting device (as may be specified by last unencrypted forward segment). Lastly, the forward segments located after the encryption location information may relate to the network (e.g., site) that includes the decrypting device and the destination device. In one or more embodiments, where the source device and the encrypting device are the same device, no forward segments coming before the encryption type information would exist, and such forwarding information would never be transmitted. Also, in one or more embodiments, where the source device and the encrypting device are the same device, the encryption type information would also not be generated or transmitted, as such information could be communicated internally in the combined source/encrypting device. Similarly, in one or more embodiments, where the decrypting device and the destination device are the same device, no forward segments located after the encryption location information would exist as it would not be necessary to forward the decrypted network traffic data unit from the decrypting device to the destination device.

In one or more embodiments, the network traffic data unit may include forwarding information that directs the network traffic data unit over several distinct virtual tunnels. For example, each portion of forwarding information may independently specify an individual tunnel and routing technique through that tunnel. Or, in one or more embodiments, the network traffic data unit may be appended with forwarding information for only a single virtual tunnel at any given time. For example, in one or more embodiments, the source device may append forwarding information that directs the network traffic data unit to the encrypting device, without providing forwarding information to the destination device. Once at the encrypting device, the encrypting device may append forwarding information that directs the network traffic data unit to the decrypting device, again without providing forwarding information to the destination device. Lastly, once at the decrypting device, the decrypting device may append forwarding information that directs the network traffic data unit to the destination device.

In Step 702, after the network traffic data unit is obtained by the source device, the source device analyzes a first forward segment of the forwarding information. In one or more embodiments, the first forward segment indicates the next network device through which the network traffic data unit is intended to traverse on the route towards the destination. Thus, in one or more embodiments, the source device performs a forwarding action to identify and store the identity of the next network device.

In Step 704, the source device removes the first forward segment of the forwarding information from the network traffic data unit. In one or more embodiments, as the next network device is already identified and stored by the source device, the forward segment indicating the next network device is no longer necessary to be included on the network traffic data unit, and is therefore removed.

In one or more embodiments, the determination and logical forwarding of the network traffic data unit occurs prior to generating and/or obtaining the forwarding information (prior to Step 702). Accordingly, in one or more embodiments, the source device will not analyze any segment of the obtained forwarding information (Step 702), and will therefore not remove any forward segment (Step 704). Thus, in one or more embodiments, the process may proceed directly from Step 700 to Step 706 (bypassing Step 702 and Step 704) when the source device performs logical forwarding to the next network device prior to obtaining and/or generating the forwarding information.

In Step 706, the source device transmits the network traffic data unit to the next network device, as specified by the first forward segment. In one or more embodiments, the next network device to receive the network traffic data unit is the encrypting device. One of ordinary skill in the art, having the benefit of this Detailed Description, would appreciate that any number of nodes devices may be located between the source device and the encrypting device, or that the source device and the encrypting device may be the same device.

In Step 708, the network traffic data unit is received, encrypted, and transmitted by the encrypting device (See FIG. 5). In one or more embodiments, the encrypting device encrypts a portion of the network traffic data unit (e.g., the portion to be encrypted) based on the contents of the network traffic data unit relating to encryption (e.g., the encryption type information and the encryption location information). Further, in one or more embodiments, the decrypting device transmits the network traffic data unit based on the forwarding information in the network traffic data unit.

In Step 710, the encrypted network traffic data unit is received by a first network device in a public network. One of ordinary skill in the art, having the benefit of this Detailed Description, would appreciate that the public network is not necessarily open to the public, but rather, the public network may be any network through which the encrypted network traffic data unit is going to traverse.

In Step 712, after the network traffic data unit is obtained by a network device in the public network, the network device analyzes the next available forward segment (i.e., next forward segment) of the forwarding information. In one or more embodiments, the next forward segment indicates the next network device through which the encrypted network traffic data unit is intended to traverse on the route towards the destination. Thus, in one or more embodiments, the network device performs a forwarding action to identify and store the identity of the next network device.

Figure 6:
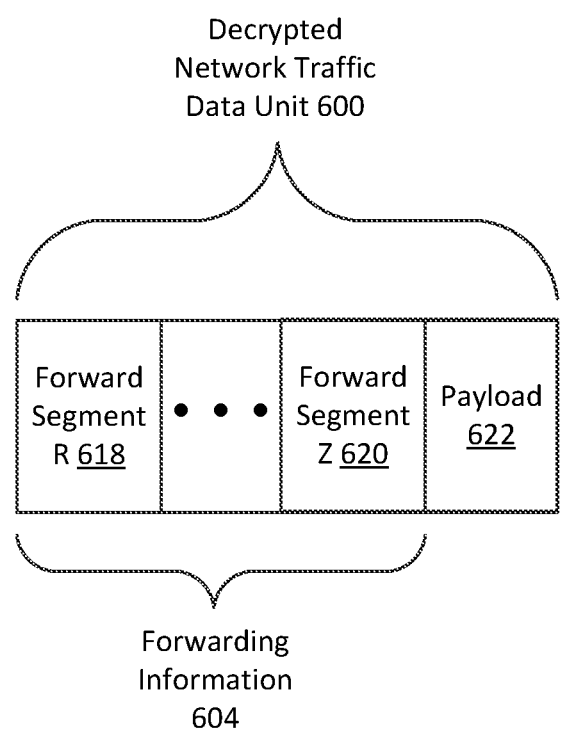
FIG. 6 shows a system in accordance with one or more embodiments.

In one or more embodiments, the 'next forward segment' is whichever forward segment is currently located at the beginning of the network traffic data unit (the left most side of FIGS. 4-6). For example, as the "first forward segment" was removed in Step 704, the second forward segment in the network traffic data unit then became the "next forward segment" (as the second forward segment was the forward segment nearest the front of the network traffic data unit after the removal of the "first forward segment").

In Step 714, the network device of the public network removes the next forward segment of the forwarding information from the network traffic data unit. In one or more embodiments, as the next network device is already identified and stored by the source device, the forward segment indicating the next network device is no longer necessary to be included on the network traffic data unit, and is therefore removed from the network traffic data unit.

In Step 716, the network device of the public network transmits the network traffic data unit to the next network device, as specified by the next forward segment. In one or more embodiments, the next network device to receive the network traffic data unit is the decrypting device. One of ordinary skill in the art, having the benefit of this Detailed Description, would appreciate that any number of nodes devices could be located between the network device of the public network and the decrypting device.

In Step 718, the decrypting device receives the encrypted network traffic data unit. In one or more embodiments, the decrypting device is located inside of a private (e.g., not public) network (e.g., site). Accordingly, in one or more embodiments, there is a presumption that the site that includes the decrypting device is sufficiently secure enough to allow for the encrypted network traffic data unit to be decrypted and transmitted in-the-clear (e.g., unencrypted, decrypted, not encrypted).

In Step 720, the decrypting device decrypts the encrypted network traffic data unit. In one or more embodiments, the decrypting device may also perform other security actions on the encrypted network traffic data unit. For example, the decrypting device may analyze the decryption information (appended to the encrypted network traffic data unit by the encrypting device) to ensure that the encrypted network traffic data unit was not maliciously or fraudulently repeated or delayed (e.g., a replay attack). Further the decrypting device may verify the contents of the encrypted portion of the encrypted network traffic data unit have not been modified (e.g., an integrity check). One of ordinary skill in the art, having the benefit of this Detailed Description, would appreciate that any form of security check may be performed upon the encrypted network traffic data unit to verify the secure transmission and content of the payload. In one or more embodiments, if the decrypting device determines that the encrypted network traffic data unit was subject to a replay attack and/or fails an integrity check, the decrypting device will drop the encrypted network traffic data unit and not process or transmit the encrypted network traffic data unit any further.

In one or more embodiments, the decrypting device is able to identify the decryption information appended to the encrypted network traffic data unit and decrypt the encrypted portion. For example, the decrypting device may (i) analyze the decryption information and determination that a particular type of encryption was utilized (e.g., MACsec type encryption), (ii) be configured to decrypt the encrypted network traffic data unit, and (iii) proceed to decrypt the payload and any forward segments (if present). A decrypted network traffic data unit, as it leaves the decrypting device, is shown in FIG. 6, according to one or more embodiments (which includes decrypted network traffic data unit (600), forwarding information (604), forward segment R (618), forward segment Z (620) and payload (622)).

In one or more embodiments, after fully decrypting and analyzing the encrypted network traffic data unit, the decrypting device (i) analyzes any forward segments (that were present inside the encrypted portion), (ii) performs a forwarding action to determine the next network device through which the decrypted network traffic data unit is going to traverse, (iii) removes that forward segment, and (iv) transmits the decrypted network traffic data unit. In one or more embodiments, the next network device is the destination device, thus the decrypting device transmits the decrypted network traffic data unit directly to the destination device.

In one or more embodiments, the decrypting device identifies the encrypted network traffic data unit as being encrypted due to the existence of the encryption location information. Accordingly, in one or more embodiments, once an encrypted network traffic data unit is known to be encrypted, the decrypting device will remove the encryption location information appended to the decrypted network traffic data unit prior to transmitting the decrypted network traffic data unit towards its destination device.

Figure 8:
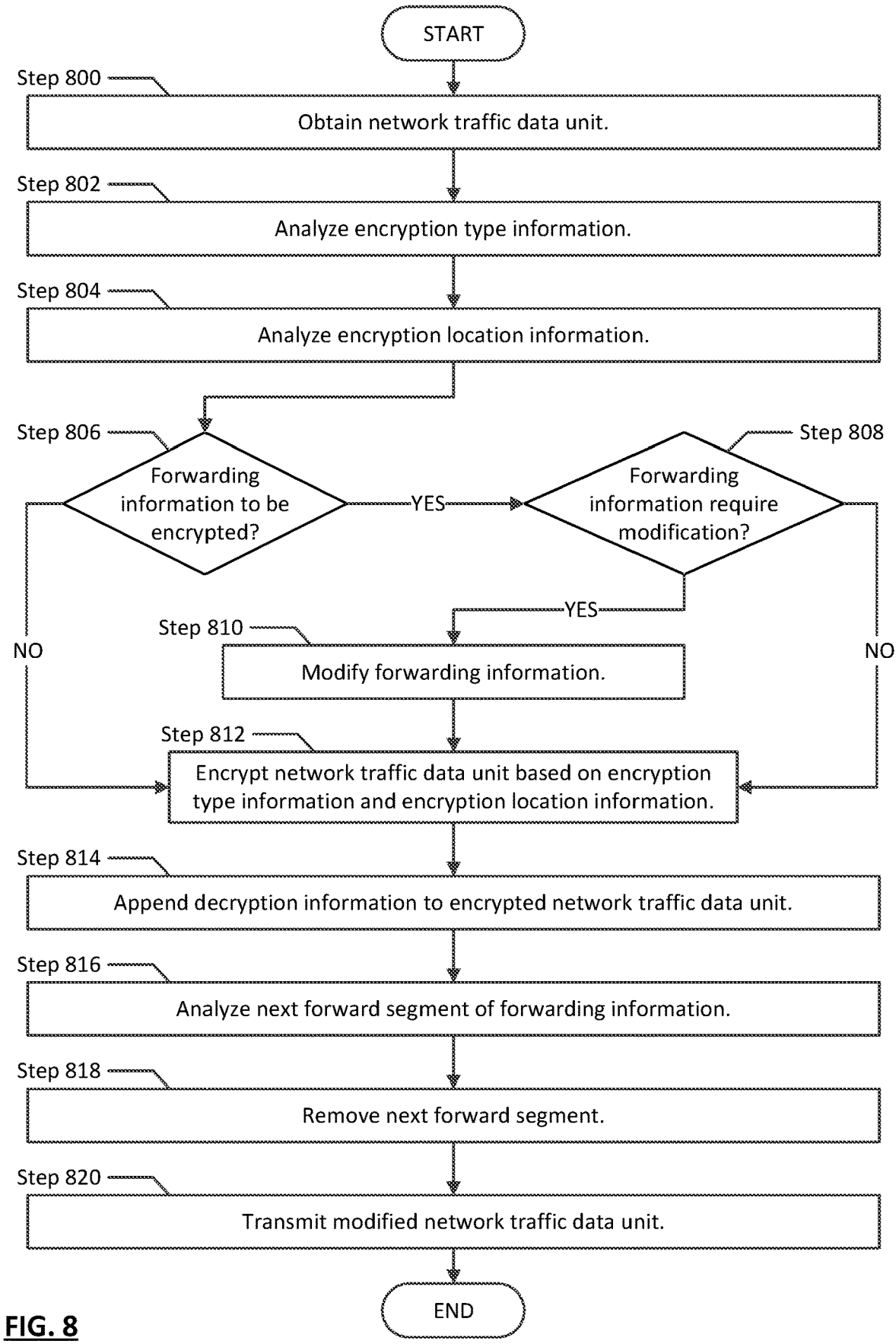
FIG. 8 shows a flowchart in accordance with one or more embodiments.

FIG. 8 shows a flowchart describing the encryption of a network traffic data unit by an encrypting device, according to one or more embodiments. While the various steps in this flowchart are presented and described sequentially, one of ordinary skill in the art, having the benefit of this Detailed Description, would appreciate that some or all of the steps may be executed in different orders, may be combined or omitted, and some or all of the steps may be executed in parallel.

In Step 800, the encrypting device receives a network traffic data unit that includes, at least, encryption type information and encryption location information. Further, in one or more embodiments, the network traffic data unit may further include forwarding information.

In Step 802, the encryption type information is analyzed to determine the type of encryption to be performed on the network traffic data unit. In one or more embodiments, the encryption type information indicates the specific type of encryption to be used by the encrypting device. For example, the encryption type information may specify MACsec type security is to be used to encrypt the portion to be encrypted. One of ordinary skill in the art, having the benefit of this Detailed Description, would appreciate that any type of suitable encryption may be used to encrypt the portion to be encrypted of the network traffic data unit.

In Step 804, the encryption type information is analyzed to determine what portion of the network traffic data unit is to be encrypted. In one or more embodiments, encryption type information indicates a location for where the encrypting device should begin encrypting the network traffic data unit (e.g., the portion to be encrypted). In one or more embodiments, the encrypting device may be configured to identify the encryption location information and further be configured to encrypt all parts of the network traffic data unit located after the encryption location information.

Alternatively, in one or more embodiments, the encryption location information may indicate the portion to be encrypted as indicated by data stored in the encryption location information itself. For example, the encrypting device may be configured to identify and read the encryption location information, where the encryption location information specifies which data of the network traffic data unit is to be encrypted, separate from the placement of the encryption location information's placement within the network traffic data unit.

In Step 806, after the portion of the network traffic data unit to be encrypted has been identified, a determination is made as to whether the portion to be encrypted includes any forwarding information (e.g., at least one forward segment). If the determination is made that there is no forwarding information to be encrypted (i.e., no forward segment is located in the portion to be encrypted) the process proceeds to Step 812. Otherwise, if forwarding information is to be encrypted (i.e., a forward segment is located in the portion to be encrypted), the process proceeds to Step 808.

In Step 808, a determination is made as to whether a part of the forwarding information requires modification as a result forwarding information being included in the portion to be encrypted (Step 806—YES). For example, in an MPLS scheme, the last forward segment of the forwarding information is indicated as the "last" forward segment by setting a BOS bit to indicate that the particular segment is the last forward segment in the network traffic data unit. However, as the last forward segment may be encrypted (and thus unreadable while traversing, for example, a public network), the BOS bit of the last unencrypted segment needs to be set. Accordingly, while the network traffic data unit is encrypted, the last in-the-clear (i.e., unencrypted) segment needs to be indicated as the "last" segment (even though forward segments exist further into the encrypted network traffic data unit, albeit in encrypted form). In one or more embodiments, the last unencrypted segment of the network traffic data unit is the encryption location information.

Thus, in one or more embodiments, two separate segments may both have their BOS bit set simultaneously (e.g., the last encrypted forward segment and the unencrypted encryption location information segment). In one or more embodiments, the source device may set both BOS bits, thus, if the BOS bit of the encryption location information is already set (as the BOS bit was set by the source device and thus setting by the encrypting device is not necessary) the process proceeds to Step 812. However, in one or more embodiments, where the BOS bit of the encryption location information is not set, the process proceeds to Step 810.

In Step 810, the encrypting device sets the BOS bit of the encryption location information. As described above in the description of Step 808, because the last forward segment of the network traffic data unit is going to be encrypted, the last in-the-clear (i.e., unencrypted) forward segment needs to be indicated as the "last" segment (even though forward segments exist further into the encrypted network traffic data unit, albeit in encrypted form).

In Step 812, the encrypting device encrypts the network traffic data unit. In one or more embodiments, the encrypting device performs the type of encryption specified by the encryption type information and encrypts the portion of the network traffic data unit specified by the encryption type information and/or encryption location information. In one or more embodiments, encrypting a portion of the network traffic data unit entails modifying the content of the encrypted portion to obscure and render unreadable content, without first being decrypted. For example, the encrypted portion may be encoded such that only those devices with the necessary information to decode the content are able to read that content. Accordingly, network devices lacking the necessary information to decode the encrypted portion are unable to read the data included in the encrypted portion.

In one or more embodiments, the encrypting device generates data unique to network traffic data unit using the network traffic data unit (e.g., a hash). Thus, in one or more embodiments, the encrypting device generates data that can be appended to the encrypted network traffic data unit to ensure to any recipient that the content of the encrypted portion was not altered. Further, in one or more embodiments, the encrypting device may generate other data that prevents (or makes more difficult) an attempt to maliciously or fraudulently repeat and/or delay the content and/or transmission of the encrypted network traffic data unit (e.g., a replay attack).

In Step 814, the encrypting device appends decryption information to the encrypted portion of the encrypted network traffic data unit. In one or more embodiments, the encrypting device appends the decryption information to the encrypted network traffic data unit during, or immediately after, the encryption of the network traffic data unit by the encrypting device. In one or more embodiments, the decryption information specifies information necessary for the decrypting device to be able to decrypt the encrypted portion of the encrypted network traffic data unit.

In one or more embodiments, the decryption information may provide and/or specify (i) the type of encryption used (e.g., MACsec type encryption), (ii) replay protection, (iii) and/or an ICV for the encrypted network traffic data unit. In one or more embodiments, decryption information is broken into two segments, one preceding the encrypted portion and one succeeding the encrypted portion. In one or more embodiments, the portion preceding the encrypted portion specifies (i) the type of encryption used and (ii) the replay protection, whereas the portion succeeding the encrypted portion specifies (iii) the ICV. One of ordinary skill in the art, having the benefit of this Detailed Description, would appreciate that any of (i) the type of encryption used, (ii) replay protection, and/or (iii) the ICV may be specified and/or provided by both portions of the decryption information, or some variation thereof.

In Step 816, the next forward segment of the forwarding information is analyzed to determine the next network device the network traffic data unit is going to traverse. In one or more embodiments, the next network device the network traffic data unit is going to traverse is located in a public network outside of the network to which the encrypting device belongs (e.g., a site).

In one or more embodiments, the next forward segment belongs to the portion of the forwarding information that indicates the path and/or routing technique to utilize while traversing a public network. In one or more embodiments, the portion of the forwarding information used for traversing a public network is not encrypted. For example, the forwarding information used to navigate the encrypted network traffic data unit through a public network may be transmitted in-the-clear (e.g., unencrypted) and thus readable, utilized, and deleted by network devices of a public network.

In Step 818, the encrypting device stores the identity of the network device identified in the next forward segment and removes the next forward segment from the network traffic data unit (e.g., logical forwarding, logically transmitting). In one or more embodiments, as the next network device through which the encrypted network traffic data unit is going to traverse is identified, and the encrypting device prepares for forwarding the encrypted network traffic data unit, the encrypting device removes the next forward segment as the forward instructions included therein are no longer necessary for the successful transmission of the encrypted network traffic data unit.

In one or more embodiments, the encrypting device will analyze and logically forward the network traffic data unit prior to Step 802 using a forward segment of the network traffic data unit that precedes the encryption location information (a process similar to the one described in Step 816 and Step 820 occurs but using the last forward segment that precedes the encryption location information). In such an embodiment, Step 816 and Step 818 are not performed as the logical forwarding decision has already been made, and the process would proceed from Step 814 directly to Step 820.

In Step 820, the encrypting device forwards (e.g., transmits) the encrypted network traffic data unit to the next network device, as specified by the next forward segment. In one or more embodiments, the next network device may be located in a public network and may further be the first network device to receive the encrypted network traffic data unit in a public network.

Figure 9:
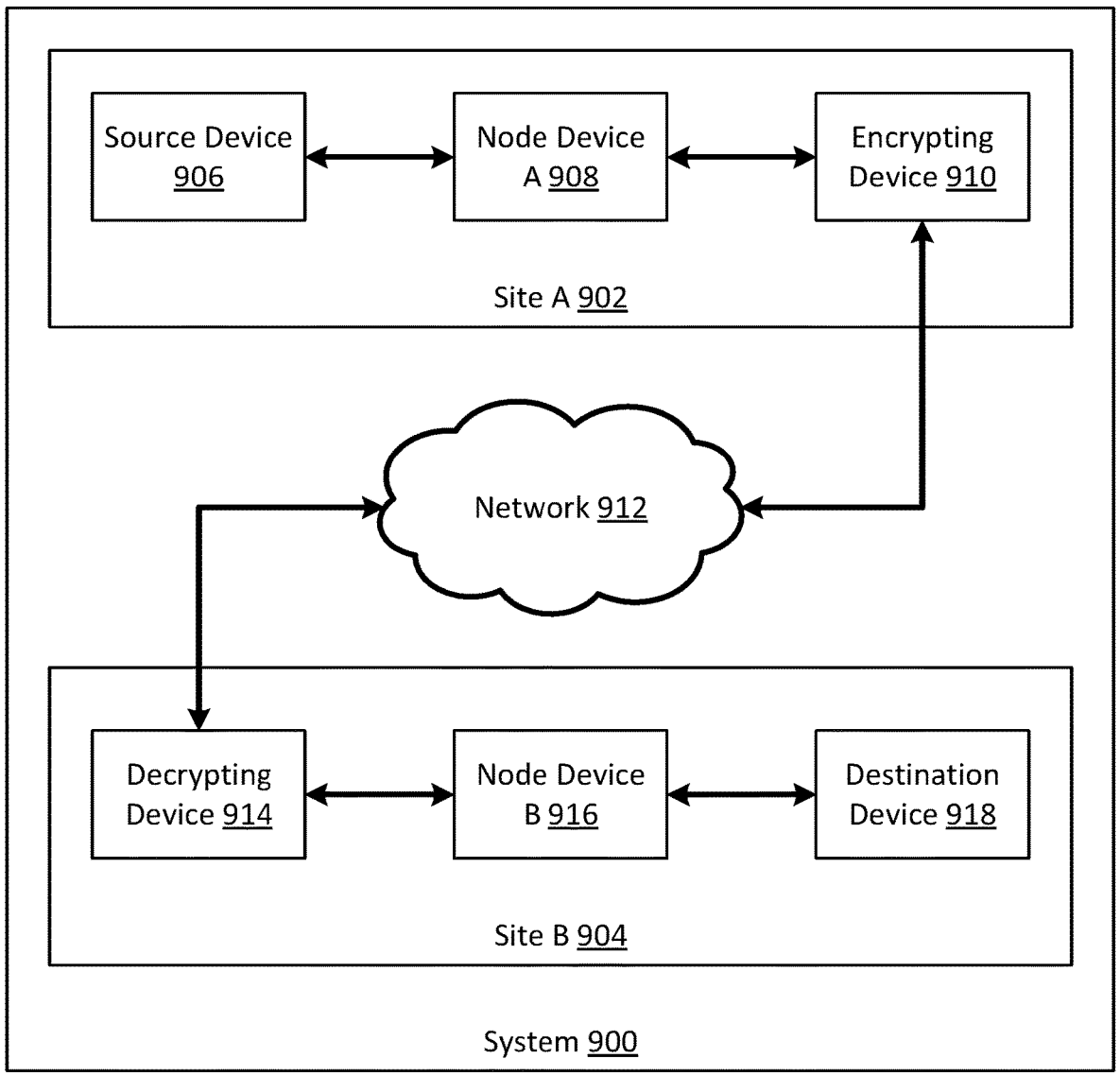
FIG. 9 shows an example in accordance with one or more embodiments.

FIG. 9 shows an example system (900) showing a possible configuration for the transmission, encryption, and decryption of a network traffic data unit. The following use case is for explanatory purposes only and not intended to limit the scope to this embodiment.

Use Case 1

In FIG. 9, consider a scenario in which, a network traffic data unit is generated by source device (906). In one or more embodiments, the network traffic data unit includes forwarding information that is broken into three distinct groups (not shown). (I) The first group of forwarding information specifies the path and scheme routing (i.e., MPLS) of the network traffic data unit through site A (902) from node device A (908) to encrypting device (910) to a network device (not shown) outside of site A (902). (II) The second group of forwarding information specifies the path and scheme routing (i.e., MPLS) and also includes a header of the encrypted network traffic data unit to and through network (912) to decrypting device (914). And lastly, (III) the third group of forwarding information specifies the path and scheme routing (i.e., MPLS) of the network traffic data unit through site B (904) from the decrypting device (914) to node device B (916) to destination device (918). Further, the source device (906) only sets the BOS bit of the last forward segment of the third group of forwarding information.

Further, in one or more embodiments, the network traffic data unit generated by the source device (906) includes encryption type information (located in the network traffic data unit between the first group of forwarding information and the second group of forwarding information) and also includes encryption location information (located in the network traffic data unit between the second group of forwarding information and the third group of forwarding information). Here, the encryption type information specifies that MACsec type encryption is to be used on the portion to be encrypted of the network traffic data unit. The encryption location information specifies that the entirety of the third group of forwarding information is to be encrypted. And further, the BOS bit of the encryption location information is not set.

In one or more embodiments, prior to the generation of the forwarding information, the source device (906) logically transmits the network traffic data unit to node device A (908) without actually transmitting the network traffic data unit. Then, after generating and appending the forwarding information to the network traffic data unit, the source device (906) transmits the network traffic data unit to node device A (908).

Node device A (908) receives the network traffic data unit and subsequently reads the next forward segment of the forwarding information. Here, the next forward segment identifies encrypting device (910) as the next network device through which the network traffic data unit is going to traverse. Accordingly, node device A (908) logically transmits the network traffic data unit to encrypting device (910) without actually transmitting the network traffic data unit. Node device A (908) then removes the forward label that identified encrypting device (910) (the last forward segment of the first group of forwarding information) and then transmit the network traffic data unit to encrypting device (910).

Encrypting device (910) receives the network traffic data unit. The last forward segment of the first group of forwarding information is used to logically forward the network traffic data unit to the next network device to be traversed (without actually forwarding) inside network (912). The last forward segment is then removed from the network traffic data unit. At this point, the first group of forwarding information has been removed from the network traffic data unit. Accordingly, the data located at the beginning of the network traffic data unit is the encryption type information. The encrypting device (910) is configured to identify the existence of the encryption type information and determine the type of encryption to use for encrypting the network traffic data unit. Further, the encrypting device (910) is configured to locate and identify the encryption location information so as to determine what portion of the network traffic data unit is going to be encrypted.

Here, the encrypting device identifies the encryption type information and the encryption location information of the network traffic data unit. Then, based on the encryption type information and the encryption location information, a determination is made that everything after the encryption location information needs to be encrypted. Further, the encrypting device determinates that forwarding information is located inside of the portion to be encrypted. Thus, a second determination is made as to whether the forwarding information not going to be encrypted needs further modification. In such an instance, as the BOS bit of the encryption location information was not set, the encrypting device then sets the BOS bit of the encryption location information.

After the encrypting device (910) finishes modifying the forwarding information, the encrypting device encrypts the portion to be encrypted (using MACsec type encryption as specified by the encryption type information) and appends the appropriate decryption information to the encrypted network traffic data unit.

Then, the encrypting device (910) subsequently reads the next forward segment of the forwarding information (the first forward segment of the second group of forwarding information). In such an instance, the next forward segment identifies a network device inside network (912). Accordingly, encrypting device (910) logically transmits the network traffic data unit to network device of network (912) without actually transmitting the network traffic data unit. Encrypting device (910) then removes the forward label that identified the network device of network (912) and then transmits the network traffic data unit to the network device of network (912).

The encrypted network traffic data unit then traverses network (912) using a combination of the forward segments and standard routing techniques as may be specified in the header included in the second group of forwarding information. However, in any circumstance, the forwarding information directs the encrypted network traffic data unit to arrive at decrypting device (914).

Decrypting device (914) then receives the encrypted network traffic data unit. At this point the entirety of the second group of forwarding information has been removed from the encrypted network traffic data unit. Accordingly, the first data available in the encrypted network traffic data unit is encryption location information that indicates the existence of the following decryption information. In turn, the decryption information specifies, at least, (i) the type of encryption used and (ii) data for the prevention of a replay attack. Further, additional decryption information exists after the encrypted portion that specifies a hash that may be used to verify that the contents of the encrypted portion have not been altered.

After receiving the encrypted network traffic data unit and verifying the content has not been altered or replayed, the decrypting device (914) decrypts the encrypted portion. Here, the encrypted portion includes both (i) a payload and (ii) a third group of forwarding information (to be used to navigate site B (904)).

After decrypting the encrypted portion of the encrypted network traffic data unit, the decrypting device (914) subsequently reads the next forward segment of the forwarding information. Here, the next forward segment identifies node device B (916) as the next network device through which the network traffic data unit is going to traverse. Accordingly, decrypting device (914) logically transmits the network traffic data unit to node device B (916) without actually transmitting the network traffic data unit. Decrypting device (914) then removes the forward label that identified node device B (916), removes the encryption location information, and transmits the network traffic data unit to node device B (916).

Node device B (916) receives the decrypted network traffic data unit and subsequently reads the next forward segment of the forwarding information. Here, the next forward segment identifies destination device (918) as the next network device through which the network traffic data unit is going to traverse. Accordingly, node device B (916) logically transmits the network traffic data unit to destination device (918) without actually transmitting the network traffic data unit. Node device B (916) then removes the forward label that identified destination device (918) (the last forward segment of the third group of forwarding information) and then transmit the network traffic data unit to destination device (918).

At the destination device (918), the network traffic data unit arrives with only the payload as originally generated. All forwarding information and encryption/decryption information was removed prior to the arrival of the network traffic data unit at the destination device (918). Accordingly, the destination device (918) may utilize the payload for whatever purpose was intended.

One or more embodiments make it possible to encrypt and/or secure network traffic that utilizes specialized routing techniques. Specifically, network traffic utilizing, for example, an MPLS scheme may have certain forwarding information included therein be encrypted in addition to the payload. Additionally, in one or more embodiments, network traffic that is to traverse a public network (and is thus susceptible to interception), may have the payload encrypted prior to leaving a non-public site and entering into the public network. Further, in one or more embodiments, some or all of the specialized forwarding information may remain unencrypted and thus may be utilized by the public network. In one or more embodiments, after traversing a public network fully encrypted, the encrypted traffic may arrive at another non-public network where, the network traffic may be decrypted (including specialized forwarding information) and continued to be forwarded towards the traffic's destination using that specialized routing technique.

While one or more embodiments have been described herein with respect to a limited number of embodiments and examples, those skilled in the art, having benefit of this disclosure, will appreciate that other embodiments can be devised which do not depart from the scope of the embodiments disclosed herein. Accordingly, the scope should be limited only by the attached claims.

What is claimed is:
1. A method for securing network traffic data, comprising:
  obtaining a network traffic data unit, comprising:
    a payload;
    forwarding information, comprising:
      a first forwarding portion; and
      a second forwarding portion that indicates a network tunnel;
    encryption type information; and
    encryption location information;
  analyzing a first segment of the first forwarding portion to obtain a first forwarding location;
  modifying the network traffic data unit, based on the encryption type information and the encryption location information, to obtain a modified network traffic data unit,
  wherein modifying the network traffic data unit comprises:
    removing the encryption type information; and
    appending decryption information, wherein the decryption information comprises:
      a unique identifier range that comprises:
        a sub-range that identifies an encrypting device, and a unique identifier that uniquely identifies the modified network traffic data unit; and
transmitting the modified network traffic data unit to the first forwarding location.

2. The method of claim 1,
wherein the encryption type information indicates that the payload and the second forwarding portion are to be modified, and
wherein modifying the network traffic data unit comprises:
  securing the payload, and
  securing the second forwarding portion.

3. The method of claim 2, wherein prior to obtaining the network traffic data unit, a source device generated the encryption type information to indicate that the second forwarding portion is to be modified.

4. The method of claim 2, wherein modifying the network traffic data unit further comprises:
  modifying the encryption location information to indicate a termination of the forwarding information; and
  modifying the encryption location information to indicate the second forwarding portion is secured.

5. A non-transitory computer readable medium comprising instructions that, when executed by a processor, perform a method comprising:
  obtaining a network traffic data unit, comprising:
    a payload;
    forwarding information, comprising:
      a first forwarding portion; and
      a second forwarding portion that indicates a network tunnel;
    encryption type information; and
    encryption location information;
  analyzing a first segment of the first forwarding portion to obtain a first forwarding location;
  modifying the network traffic data unit, based on the encryption type information and the encryption location information to obtain a modified network traffic data unit,
  wherein modifying the network traffic data unit comprises:
    removing the encryption type information; and
    appending decryption information, wherein the decryption information comprises:
      a unique identifier range that comprises:
        a sub-range that identifies an encrypting device, and
        a unique identifier that uniquely identifies the modified network traffic data unit; and
    transmitting the modified network traffic data unit to the first forwarding location.

6. The non-transitory computer readable medium of claim 5,
wherein the encryption type information indicates that the payload and the second forwarding portion are to be modified, and
wherein modifying the network traffic data unit comprises:
  securing the payload, and
  securing the second forwarding portion.

7. The non-transitory computer readable medium of claim 6, wherein prior to obtaining the network traffic data unit, a source device generated the encryption type information to that the second forwarding portion is to be modified.

8. The non-transitory computer readable medium of claim 6, wherein modifying the network traffic data unit further comprises:
  modifying the encryption location information to indicate a termination of the forwarding information; and
  modifying the encryption location information to indicate the second forwarding portion is secured.

9. A system for securing and decrypting network traffic, the system comprising:
  an encryption device, configured to:
    obtain a network traffic data unit, comprising:
      a payload;
      forwarding information, comprising:
        a first forwarding portion; and
        a second forwarding portion that indicates a network tunnel;
      encryption type information; and
      encryption location information;
    analyze a first segment of the first forwarding portion to obtain a first forwarding location;
    modify the network traffic data unit, based on the encryption type information and the encryption location information to obtain a modified network traffic data unit,
    wherein modifying the network traffic data unit comprises:
      removing the encryption type information; and
      appending decryption information, wherein the decryption information comprises:
        a unique identifier range that comprises:
          a sub-range that identifies an encrypting device, and
          a unique identifier that uniquely identifies the modified network traffic data unit; and
      transmit the modified network traffic data unit to the first forwarding location; and
  a decryption device, configured to:
    receive the modified network traffic data unit; and
    modify the modified network traffic data unit.

10. The system of claim 9, wherein:
modifying the payload, by the encrypting device, comprises:
  removing the encryption type information;
  encrypting the payload; and
  appending decryption information; and
modifying the modified network traffic data unit, by the decrypting device, comprises:
  analyzing the decryption information; and
  decrypting the payload based on the decryption information.

11. The system of claim 10,
wherein the encryption type information indicates that the payload and the second forwarding portion are to be modified, and
wherein modifying the network traffic data unit comprises:
  securing the payload, and
  securing the second forwarding portion.

12. The system of claim 11, wherein prior to obtaining the network traffic data unit, a source device generated the encryption type information to indicate that the second forwarding portion is to be modified.

13. The system of claim 11, wherein modifying the network traffic data unit further comprises:
  modifying the encryption location information to indicate a termination of the forwarding information; and
  modifying the encryption location information to indicate the second forwarding portion is secured.

* * * * *